(12) United States Patent
Yoshida

(10) Patent No.: US 6,577,860 B1
(45) Date of Patent: Jun. 10, 2003

(54) DATA TRANSMISSION-RECEPTION SYSTEM EMPLOYING PORTABLE RADIO TERMINAL

(75) Inventor: Kenichi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 400 days.

(21) Appl. No.: 09/693,910

(22) Filed: Oct. 23, 2000

(65) Prior Publication Data (65)

(30) Foreign Application Priority Data

Oct. 22, 1999 (JP) .............................. 11-301726

(51) Int. Cl.[7] ..................... H04M 1/00; H04M 11/10
(52) U.S. Cl. .................. 455/412; 455/423; 455/557; 455/558
(58) Field of Search .................. 455/412, 413, 455/414, 422, 423, 426, 67.1, 277.2, 3.01, 3.05, 557, 558, 556, 135

(56) References Cited

U.S. PATENT DOCUMENTS 6,289,216 B1 * 9/2001 Koh et al. .................. 455/424
6,408,189 B1 * 6/2002 Nakamura et al. .......... 455/504

* cited by examiner

*Primary Examiner*—Duc Nguyen
(74) *Attorney, Agent, or Firm*—McGinn & Gibb, PLLC

(57) ABSTRACT

A data transmission-reception system is disclosed wherein, after the radio wave condition becomes good, backup processing is performed immediately without performing confirmation of the memory capacity of a portable radio terminal thereby to allow efficient transmission-reception of data such as an electronic mail. Information of a mail server is received by a portable telephone terminal through a dialup server and then transferred to an electronic mail terminal. In this instance, when the radio wave condition is good, a card loaded in the portable telephone terminal accesses the mail server as a representative of the electronic mail server and fetches electronic mails stored in the mail server and destined for the user into the electronic mail terminal through the dialup server and the portable telephone terminal. Here, the fact that the radio wave condition exhibits that reception of the radio wave is possible is used as a trigger to perform reception of transfer data without performing discrimination of whether the transfer data can be stored into a memory of the portable telephone terminal. Then, the transfer data are not stored into the portable telephone terminal but stored directly into a memory of the electronic mail terminal.

14 Claims, 12 Drawing Sheets

DATA TRANSMISSION-RECEPTION SYSTEM EMPLOYING PORTABLE RADIO TERMINAL

BACKGROUND OF THE INVENTION

1. Field of the Invention

The present invention relates to a data transmission-reception system wherein a portable radio terminal which can transmit and receive data to and from a server over a radio channel and temporarily store such data is used to allow transmission-reception of data between the information terminal as a client and the server.

2. Description of the Related Art

Conventionally, when a portable information terminal or a like apparatus is used to transmit or receive an electronic mail by radio, either an apparatus wherein a portable telephone terminal such as a portable telephone set or a telephone terminal of the personal handyphone system (hereinafter referred to as PHS) and a portable information terminal are integrated with each other is used or a portable telephone terminal and a portable information terminal are connected to each other by a cable or the like and used in this state. However, the apparatus of the type wherein a portable telephone terminal and a portable information terminal are integrated with each other is excessively large when it is used as a portable telephone terminal, and besides is inferior in functions to popular portable information terminals. Therefore, a portable telephone terminal and a portable information terminal are frequently connected to each other by a cable or the like to transmit or receive an electronic mail.

However, while an electronic mail is being transmitted or received, the portable information terminal and the portable telephone terminal must be kept connected to each other, and this gives rise to a problem that the portability which is an advantage of the portable telephone terminal is deteriorated or lost. Further, data transmission processing on the portable information terminal is conventionally performed by an operation of it by a user. Also where data transmission is performed automatically, it is necessary to keep the power to the portable information terminal and the portable radio terminal on and keep communication software operating. Further, when the radio wave condition is not favorable or good, it must be waited that the radio wave condition becomes good. Therefore, the portable information terminal and the portable radio terminal consume the power in vain.

In particular, where the radio wave condition is not good, it is impossible to establish connection to a server and perform transmission-reception of data. Therefore, it is waited that the radio wave condition becomes good while power to the portable information terminal and the portable radio terminal is kept on. Then, after it is confirmed that the radio wave condition has become good, a manual operation for data transmission-reception must be performed. This is inconvenient to the user. Further, the user need supervise the radio wave condition incessantly, and this is a burden to the user.

Further, it is essentially required to form the portable radio terminal in a reduced size and with a reduced weight because much importance is attached to the portability from its nature. Therefore, the portable radio terminal cannot include a storage medium of a large capacity therein. If the portable radio terminal otherwise includes a storage medium of a large capacity, then the portability is deteriorated significantly. Accordingly, also it is a problem that the portable radio terminal can store only a limited amount of data.

Furthermore, because the storage capacity is small and because the amount of data transmitted from a server is not fixed and the capacity of data which can be transferred by one transmission cycle cannot be estimated, the remaining capacity of the storage medium cannot be grasped accurately. Consequently, there is an inconvenience in use in that, when data transmission-reception is performed automatically, the remaining capacity of the storage medium is used up soon and the transmission-reception of data must be stopped immediately at the point of time.

Besides, if it is tried to perform data communication at a place where the radio wave condition is not good, then the portable information terminal and the portable radio terminal must be started and the radio wave condition must be confirmed every time, and then, it is necessary to keep the portable information terminal and the portable radio terminal operating until the radio wave condition becomes favorable. Therefore, power is dissipated in vain. Particularly since the portable radio terminal for which the portability is required is driven by a battery and is limited in applicable power, it is desirable to minimize power consumption to avoid exhaustion of the battery to the utmost.

Further, in the prior art, after the radio wave condition becomes favorable, the size of transfer data is confirmed between the portable information terminal and the portable radio terminal, and when the memory capacity of the portable radio terminal is insufficient, a backup operation is performed and then data transfer is performed. Such a transmission method as just described is low in efficiency in time in that an overhead time for data transfer is required because data transfer is performed after the backup operation is completed.

SUMMARY OF THE INVENTION

It is an object of the present invention to provide a data transmission-reception system wherein, after the radio wave condition becomes good, data transfer can be performed immediately between a portable radio terminal and an information terminal without the necessity for confirmation of the memory capacity of the portable radio terminal.

It is another object of the present invention to provide a data transmission-reception system wherein data transmission-reception of an electronic mail or the like can be performed automatically even if a user does not supervise the radio wave condition.

It is a further object of the present invention to provide a data transmission-reception system wherein data transfer can be performed between an information terminal and a portable radio terminal without connecting them to each other by means of a cable.

In order to attain the objects described above, according to the present invention, there is provided a data transmission-reception system, comprising a server, an information terminal serving as a client, and a portable radio terminal capable of transmitting and receiving data to and from the server over a radio circuit for allowing communication of data between the information terminal and the server, the portable radio terminal including storage means for temporarily storing data, radio wave condition detection means for detecting whether or not a radio wave condition is good, and control means for controlling the portable radio terminal such that, upon reception of data from the server, when the radio wave condition is good, data received from the server is transferred immediately to the information terminal without being stored into the storage means, and upon transmission of data to the server, when the radio wave condition is, good, data transferred from the information terminal is transmitted to the server.

In the data transmission-reception system, upon transmission-reception, the fact that the radio wave state becomes a transmission-reception allowing state is used as a trigger to start transfer of data to be transferred without discriminating whether or not the data to be transferred can be stored into the memory of the portable radio terminal, and the data are not stored into the memory of the portable radio terminal but a restored directly into a memory of the information terminal. Thus, since backup processing is performed immediately when the radio wave condition becomes good, when data transfer becomes possible actually, it is possible to make free the memory of the portable radio terminal already. Consequently, data transfer can be performed efficiently in time.

Preferably, the data transmission-reception system further comprises a data transfer medium capable of being selectively connected to the portable radio terminal and the information terminal, the data transfer medium having a memory function and a data transfer function, the data transfer medium when connected to the portable radio terminal being operable to store reception data received by the portable radio terminal and transfer stored data to be transmitted to the portable radio terminal, the data transfer medium when connected to the information terminal being operable to transfer stored reception data to the information terminal and store data to be transmitted from the information terminal. Preferably, the data transfer medium is a card in which a memory is built.

In the data transmission-reception system, even if the information terminal such as, for example, an electronic mail terminal is not directly connected to the portable telephone terminal by a cable or the like, transmission-reception of an electronic mail or the like can be performed between them, and such an electronic mail or the like can be transmitted and received automatically even if the user does not take notice of the radio wave condition. In particular, the information terminal is started up and data can be read in from the information terminal and transmitted automatically in order that such a situation that the remaining amount of the memory of the portable radio terminal is used up during a transmission period of data and transmission is disabled may not occur.

The portable radio terminal may store data to be transmitted transferred from the information terminal and transmit the data to the server when the radio wave condition is good.

The portable radio terminal may further include interruption generation means for generating an interruption signal to the information terminal when the radio wave condition becomes good, and when the information terminal receives the interruption signal, the information terminal may transfer data to be transmitted to the portable radio terminal.

Alternatively, the portable radio terminal may further include interruption generation means for generating an interruption signal to the information terminal when the radio wave condition becomes good, and when the information terminal may receive the interruption signal, the information terminal starts up communication software thereof.

In this instance, when the information terminal receives the interruption signal from the portable radio terminal, the information terminal may confirm whether or not the information terminal is in a suspended state, and when the information terminal is in a suspended state, the information terminal may first make supply of power to components thereof available and then start up the communication software. Further, after the information terminal starts up the communication software, the information terminal may transfer data to be transmitted to the portable radio terminal and then stop the supply of power to the components thereof to restore its suspended state.

The portable radio terminal may further include memory capacity confirmation means for receiving a transmission data capacity notification from the information terminal and confirming whether or not the transmission data to be received from the information terminal can be stored into the storage means, and when a result of the confirmation by the memory capacity confirmation means indicates that the transmission data can be stored into the storage means, the information terminal may transfer the data to be transmitted to the portable radio terminal.

The portable radio terminal may include transmission data presence/absence storage means for storing that a data transmission request has been received from the information terminal when the result of the confirmation by the memory capacity confirmation means indicates that the transmission data cannot be stored into the storage means.

The server and the information terminal of the data transmission-reception system allows several combinations. In particular, they may be a combination wherein the server is a mail server, and the information terminal is an electronic mail terminal, another combination wherein the server is a hyper text transfer protocol (HTTP) server, and the information terminal is a web browser terminal, and a further combination wherein the server is a database server, and the information terminal is a database search terminal.

The portable radio terminal may be a portable telephone terminal.

With the data transmission-reception system described above, the following advantages can be anticipated.

Firstly, when the radio wave condition becomes good, transfer of data can be performed immediately between the portable radio terminal and the information terminal without discriminating the memory capacity of the portable radio terminal, that is, when the, radio wave condition becomes good, backup processing is performed immediately without confirmation of the memory capacity. Consequently, data transfer can be performed efficiently in time between the information terminal and the portable radio terminal. In other words, since backup processing is proceeding already when the radio wave condition becomes good and connection of a circuit is performed, when data transfer becomes possible actually, the memory capacity of the portable radio terminal can be free. Consequently, data transfer can be performed efficiently and consumption of a battery can be prevented.

Secondly, even when the memory remaining amount of the portable radio terminal is used up during data transmission, data transmission can be performed from the information terminal. The reason is that, before the information terminal performs data reception, it notifies the portable radio terminal of an amount of data to be transmitted and, if the free capacity of the memory is not insufficient, then when the portable radio terminal transmits data which have already been in the server, data are transmitted from the information terminal to the portable radio terminal. Further, since this processing is performed automatically also when the user or some other person is not present around the information terminal or when the information terminal is in a suspended state, the person who operates the information terminal need not take notice of the radio wave condition.

Thirdly, if the memory remaining amount of the portable radio terminal is insufficient when the information terminal performs data transmission, then the user can recognize that some transmission data remain in the information terminal. The reason is that the portable radio terminal has a function of confirming the capacity of data to be transmitted, comparing the data capacity with the remaining amount of the memory of the portable radio terminal, stopping, if the memory remaining amount is insufficient, storage of the data and storing the fact that some transmission data remain in the information terminal.

Fourthly, the information terminal can discriminate that it has become possible to store transmission data into the memory of the portable radio terminal. The reason is that the information terminal has a function of recognizing an interruption from the portable radio terminal and confirming the interruption factor. In particular, power is always supplied to a mechanism for recognizing an interruption and confirming the factor of the interruption, and consequently, an interruption can always be recognized. Consequently, the information terminal can discriminate a timing at which transmission data can be stored into the portable radio terminal.

Fifthly, radio data communication can be performed efficiently. The reason is that, if the portable radio terminal recognizes that the radio wave condition has become good, then it starts data transfer to the information terminal without waiting that the memory capacity becomes free. In particular, when the communication rate of radio data is higher than the transfer rate between the portable radio terminal and the information terminal, data transfer can be performed between the portable radio terminal and the information terminal without interrupting the radio data communication. Since much time is required to establish communication in the first stage in radio data communication, the efficiency in time is much higher if data are transferred at a time without performing re-connection. Further, in radio data communication of the circuit connection type, since a charge is imposed based on the period during which a circuit is connected, the charge is lower when communication is ended earlier after a connection is established once.

Sixthly, even if the user or some other person is not present around the information terminal or the information terminal is in a suspended state, the information terminal can be automatically rendered operative. The reason is that, when the information terminal is in a power-on state, it can automatically render itself operative by recognizing an interruption and confirming the factor of the interruption. On the other hand, when the information terminal is in a suspended state, if it recognizes an interruption, then power is supplied to necessary components of the information terminal to place them into an enabled state. The information terminal thus has a mechanism called power management mechanism.

Seventhly, even if the user or some other person is not present around the information terminal or the information terminal is in a suspended state, the information terminal can automatically perform data transfer. The reason is that the information terminal has a program which is automatically started up to allow communication with the portable ratio terminal when the components of the information terminal are in an enabled state as described above. Further, where the portable radio terminal has a program which can communicate with the program of the information terminal, mutual communication between the information terminal and the portable radio terminal can be performed.

Eighthly, even if the user or some other person is not present around the information terminal or the information terminal is in a suspended state, the information terminal can automatically start up itself and automatically end its operation. The reason is that the program has a mechanism for automatically starting up itself, performing data transfer and automatically ending itself after the data transfer comes to an end. Further, the program has a power management mechanism for automatically stopping, when the information terminal is automatically started up from a suspended state, supply of power to the components of the information terminal to put the information terminal into a suspended state after data transfer comes to an end.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
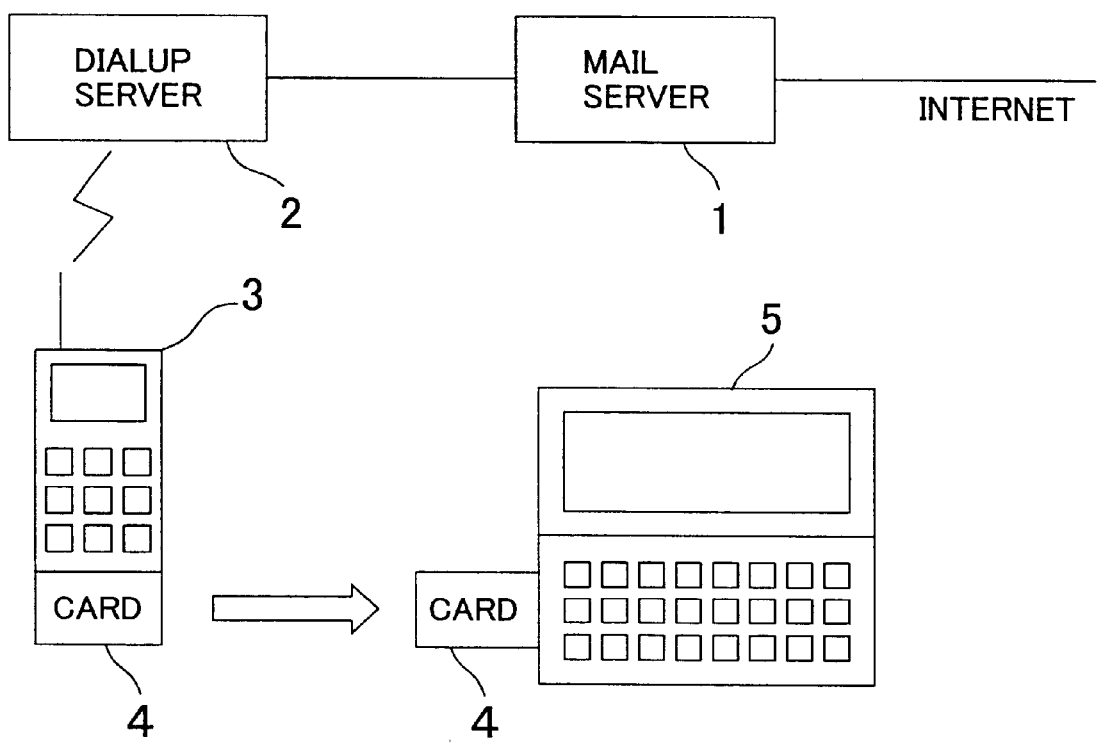
FIG. 1 is a block diagram showing a general system construction of a data transmission-reception system to which the present invention is applied.

Referring first to FIG. 1, there is shown a general construction of a transmission-reception system to which the present invention is applied. A dialup server 2 is connected to the Internet through a mail server 1. The dialup server 2 is connected to a portable telephone terminal 3 such as a portable telephone set or a PHS terminal which is a portable radio terminal, by a radio circuit. The portable telephone terminal 3 can transfer data to and from an electronic mail terminal 5 as a portable information terminal through a PC card or an IC card 4 (hereinafter referred to simply as card 4) for data transfer as a data transfer medium.

The portable telephone terminal 3 has radio wave condition detection means for detecting whether the radio wave condition at its radio section is good or bad as one of functions of a CPU thereof (in the present specification, a function of a CPU is often referred to as means). The card 4 is selectively loaded into the portable telephone terminal 3 and the electronic mail terminal 5 for transmission-reception of an electronic mail. The card 4 has such a sufficiently small size that, even if it is loaded in the portable telephone terminal 3, it does not deteriorate the portability of the portable telephone terminal 3.

When the card 4 is loaded in the portable telephone terminal 3, it is connected as a representative of the electronic mail terminal 5 to the mail server 1 through the portable telephone terminal 3 selectively when the radio wave condition at the portable telephone terminal 3 is good. Then, the card 4 can fetch electronic mails accumulated in the mail server 1 and destined for the user through the dialup server 2 and the portable telephone terminal 3. Also it is possible to transmit electronic mails accumulated in the card 4 similarly.

On the other hand, when the card 4 is loaded in the electronic mail terminal 5, it functions as if it were a mail server. Accordingly, the electronic mail terminal 5 can perform transmission-reception processing of mails in accordance with a method similar to that where it is connected to the mail server 1. In this manner, transmission-reception processing of electronic mails can be performed by the electronic mail terminal 5 without taking notice of the radio wave condition at the portable telephone terminal 3.

Figure 2:
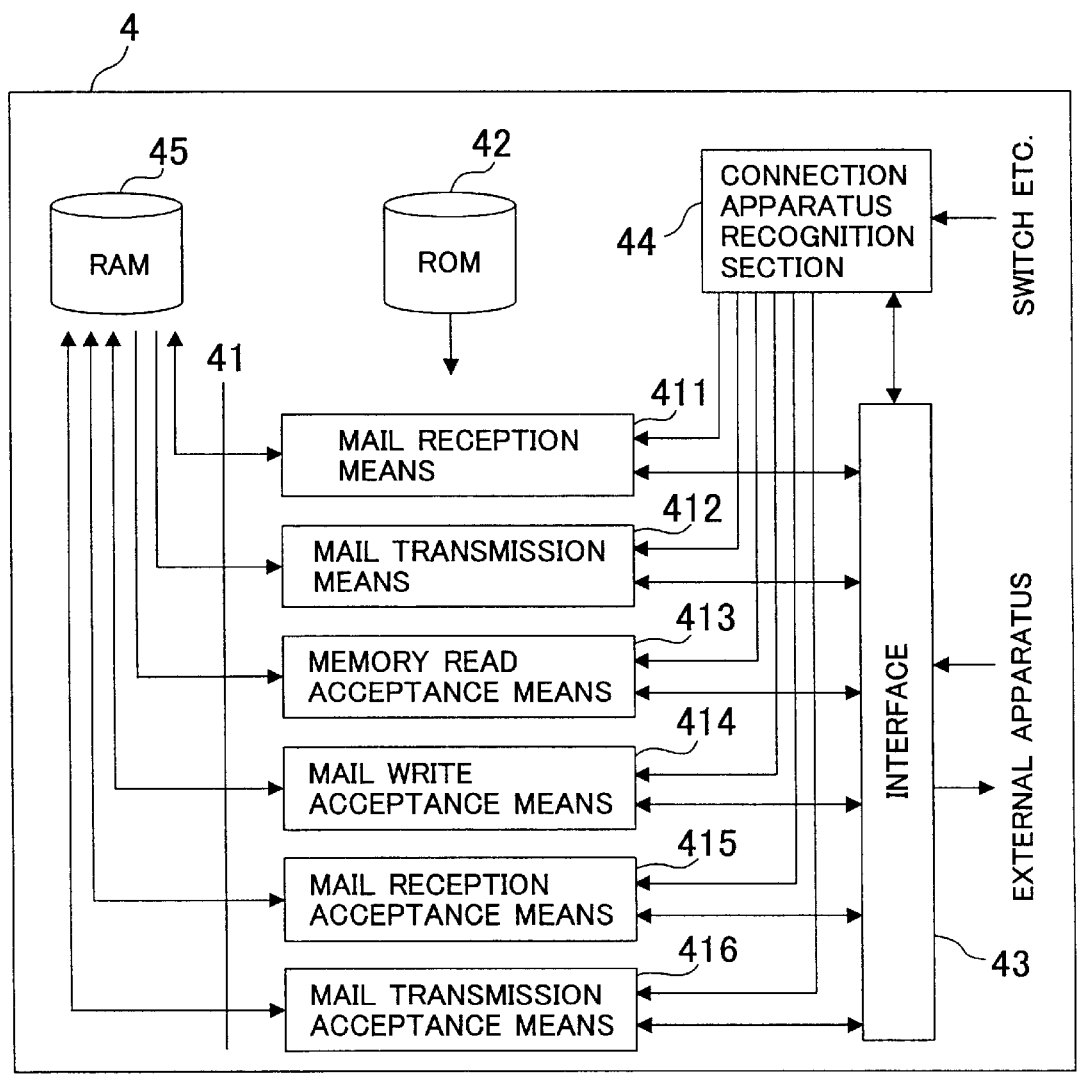
FIG. 2 is a block diagram showing an internal construction of a card shown in FIG. 1.

FIG. 2 shows an internal construction of the card 4 shown in FIG. 1.

Referring to FIG. 2, the card 4 shown includes a central processing unit (CPU) 41, a read only memory (ROM) 42, an interface 43, a connection apparatus recognition section 44, and a random access memory (RAM) 45. The CPU 41 executes a program stored in the ROM 42 or the RAM 45 and thereby functions as mail reception means 411, mail transmission means 412, memory read acceptance means 413, mail write acceptance means 414, mail reception acceptance means 415 and mail transmission acceptance means 416.

The mail reception means 411 operates when the card 4 is connected to the portable telephone terminal 3, and reads in setting information necessary for reception of an electronic mail and sends a request to the mail server 1 through the portable telephone terminal 3 and the dialup server 2 to transmit an electronic mail destined for the user through the interface 43. Then, if the body of an electronic mail is sent from the mail server 1 to the card 4 through the dialup server 2 and the portable telephone terminal 3, then the mail reception means 411 stores the electronic mail into the RAM 45.

Also the mail transmission means 412 operates when the card 4 is connected to the portable telephone terminal 3. If an electronic mail to be transmitted is stored in the RAM 45, then the mail transmission means 412 reads in the body of the electronic mail and setting information necessary for electronic mail transmission from the RAM 45 and transmits the body of the electronic mail to the mail server from the interface 43 through the portable telephone terminal 3 and the dialup server 2.

The memory read acceptance means 413 transfers, if a read request for contents of the RAM 45 is received from an external apparatus, that is, the portable telephone terminal 3 or the electronic mail terminal 5, the contents of the RAM 45 through the interface 43 to the portable telephone terminal 3 or the electronic mail terminal 5.

The mail write acceptance means 414 writes, when it receives a write request into the RAM 45 from the portable telephone terminal 3 or the electronic mail terminal 5 through the interface 43, contents to be written sent thereto together with the write request into the RAM 45.

The mail reception acceptance means 415 operates when the card 4 is connected to the electronic mail terminal 5, and transfers, when it receives an electronic mail reception request to the mail server 1 from the electronic mail terminal 5 through the interface 43, an electronic mail stored in the RAM 45 to the electronic mail terminal 5.

Also the mail transmission acceptance means 416 operates similarly when the card 4 is connected to the electronic mail terminal 5, and stores, when it receives an electronic mail transmission request to the mail server 1 from the electronic mail terminal 5 through the interface 43, the body of an electronic mail sent thereto from the electronic mail terminal 5 into the RAM 45.

The ROM 42 has a program stored therein for providing means to be executed by the CPU 41. The interface 43 is an interface for communicating information of the radio wave condition or a connected apparatus, contents of an electronic mail and stored contents of the RAM 45 with the portable telephone terminal 3 and the electronic mail terminal 5. It is necessary for the portable telephone terminal 3 and the electronic mail terminal 5 to have a similar interface in order to communicate information with the interface 43.

The connection apparatus recognition section 44 is means for recognizing to which apparatus the card 4 is currently connected from information from a physical switch or switches and from the interface 43.

The RAM 45 is a storage area into which an electronic mail fetched, an electronic mail to be transmitted, various setting information necessary for transmission-reception, contents of a program stored in the ROM 42 and so forth are stored. The RAM 45 must have such a countermeasure provided thereto which prevents stored contents thereof from disappearing such as, for example, to employ a flash memory which is a nonvolatile memory or power is supplied to the RAM 45 incessantly.

Figure 3:
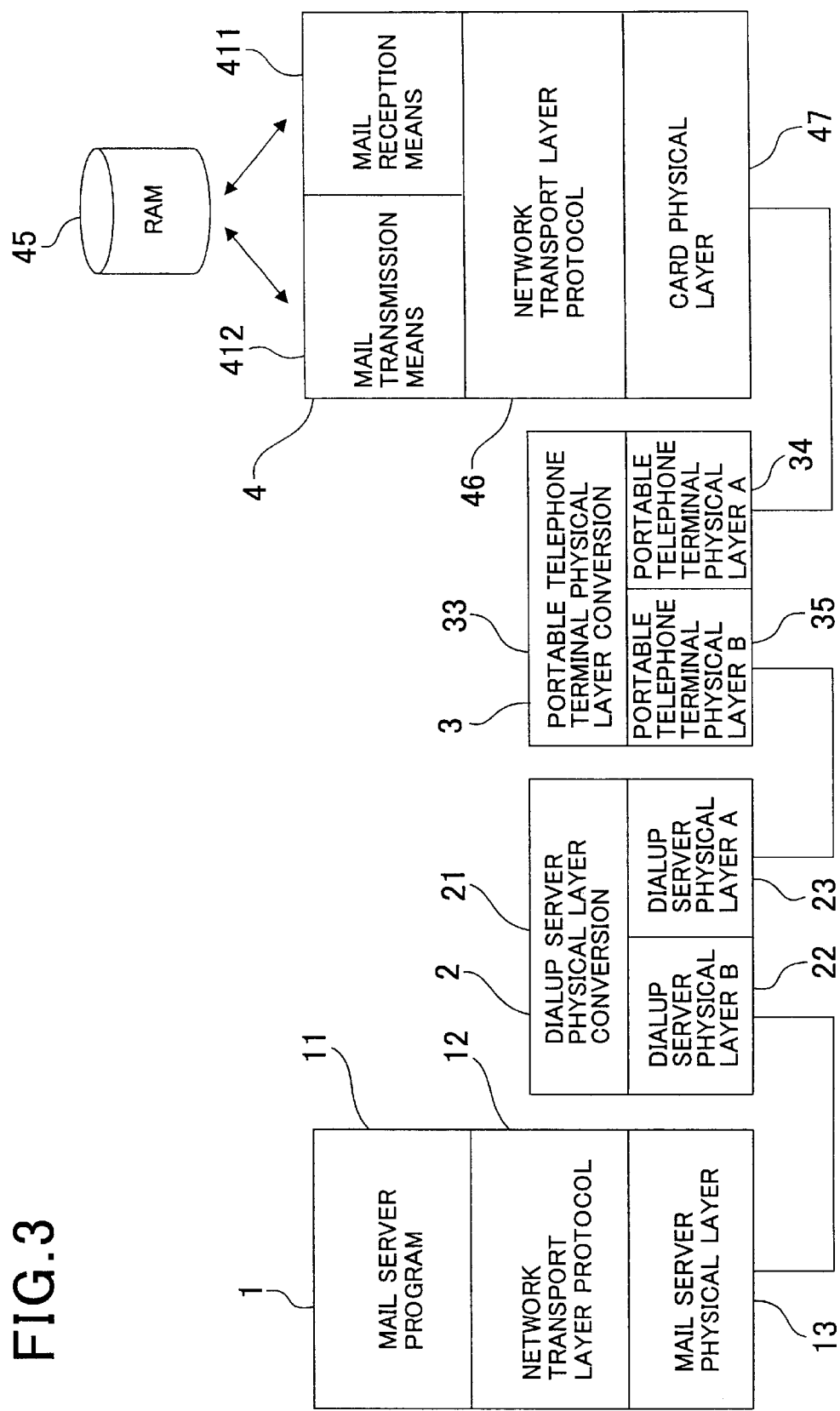
FIG. 3 is a diagrammatic view illustrating a protocol hierarchy in the data transmission-reception system of FIG. 1.

FIG. 3 illustrates a protocol hierarchy in the data transmission-reception system of FIG. 1, that is, a protocol hierarchy when the card 4 is connected to the portable telephone terminal 3. Referring to FIG. 3, a network transport layer protocol 12 of the mail server 1 side and a network transport layer protocol 46 of the card 4 side have a network layer such as, for example, the TCP/IP and a transport layer.

A portable telephone terminal physical layer A 34 and a card physical layer 47 are, for example, an RS232C interface. A dialup server physical layer 23 and a portable telephone terminal physical layer B 35 are radio communication. A dialup server physical layer B 22 and a mail server physical layer 13 are, for example, an ethernet. A dialup server physical layer conversion 21 and a portable telephone terminal physical layer conversion 33 perform conversion between two physical layers positioned below them.

The card 4 having such a construction as described above operates as a representative of the electronic mail terminal 5.

In this instance, the mail reception means 411 and the mail transmission means 412 operate, but the mail reception acceptance means 415 and the mail transmission acceptance means 416 do not operate.

More specifically, when the user indicates a clear instruction to receive an electronic mail through the interface 43 of FIG. 2 or when the radio wave condition of the portable telephone terminal 3 sent from the interface 43 is good and a timing set by the user comes, the mail reception means 411 of the card 4 requests the portable telephone terminal 3 to establish connection to the dialup server 2. Then, when the connection is completed, the mail reception means 411 checks whether or not there is an electronic mail destined for the user in the mail server 1 stored as setting information in advance in the RAM 45. If such an electronic mail is present, then the electronic mail is sent from the mail server 1 to the mail reception means 411 through the interface 43, and the mail reception means 411 stores the electronic mail into the RAM 45. Simultaneously, the mail transmission means 412 checks whether or not an electronic mail to be transmitted is stored in the RAM 45. If an electronic mail to be transmitted is present, then the electronic mail is transmitted to the mail server 1 through the interface 43.

Figure 4:
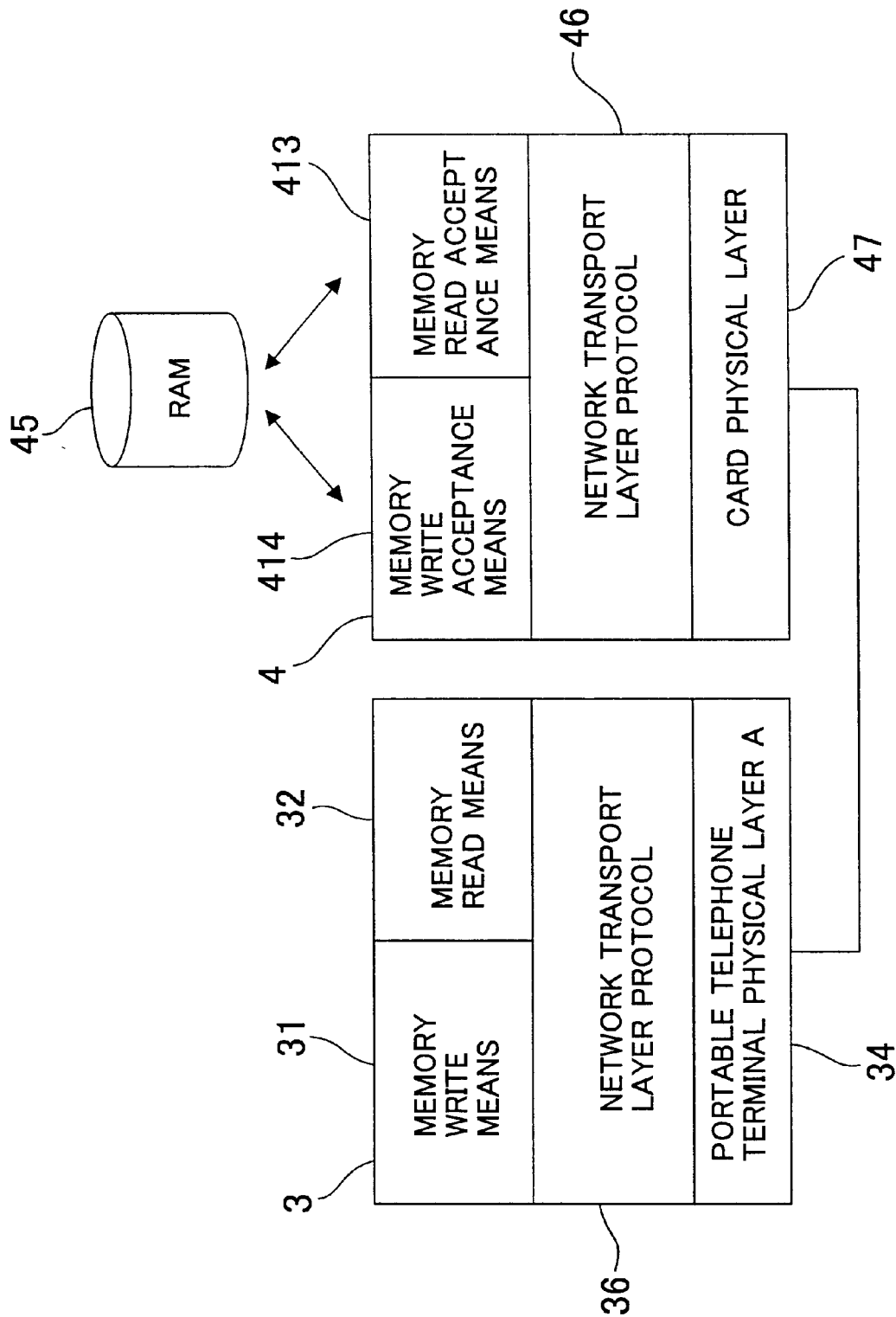
FIG. 4 is a diagrammatic view illustrating a protocol hierarchy between a portable telephone terminal and the card in the data transmission-reception system of FIG. 1.

FIG. 4 illustrates a protocol hierarchy between the portable telephone terminal 3 and the card 4 in the system of FIG. 1, that is, a protocol hierarchy when an electronic mail fetched in the card 4 is read and written by the portable telephone terminal 3.

A network transport layer protocol 36 of the portable telephone terminal 3 side and the network transport layer protocol 46 of the card 4 side are such as, for example, the TCP/IP. Here, when the portable telephone terminal 3 refers to stored contents of the RAM 45 in the card 4, memory read means 32 in the portable telephone terminal 3 transmits a read request and an object address for reading to the memory read acceptance means 413 of the card 4 side. Consequently, the memory read acceptance means 413 reads out stored contents at the designated address of the RAM 45 and transmits the read out contents to the memory read means 32 through the interface 43. This can be utilized to transmit electronic mails accumulated in the RAM 45 to the portable telephone terminal 3. If the portable telephone terminal 3 includes means for displaying contents of an electronic mail, then this can be utilized to access electronic mails fetched in the card 4 on the portable telephone terminal 3.

When writing from the portable telephone terminal 3 into the RAM 45 is to be performed, memory write means 31 in the portable telephone terminal 3 transmits contents to be written in and an object address for writing to the mail write acceptance means 414 of the card 4. Consequently, the mail write acceptance means 414 in the card 4 writes the contents into the designated address of the RAM 45. If this is utilized, then if the portable telephone terminal 3 includes means for inputting an electronic mirror, then the portable telephone terminal 3 by itself can transmit an electronic mail by sending an electronic mail inputted by the inputting means to the RAM 45.

Figure 5:
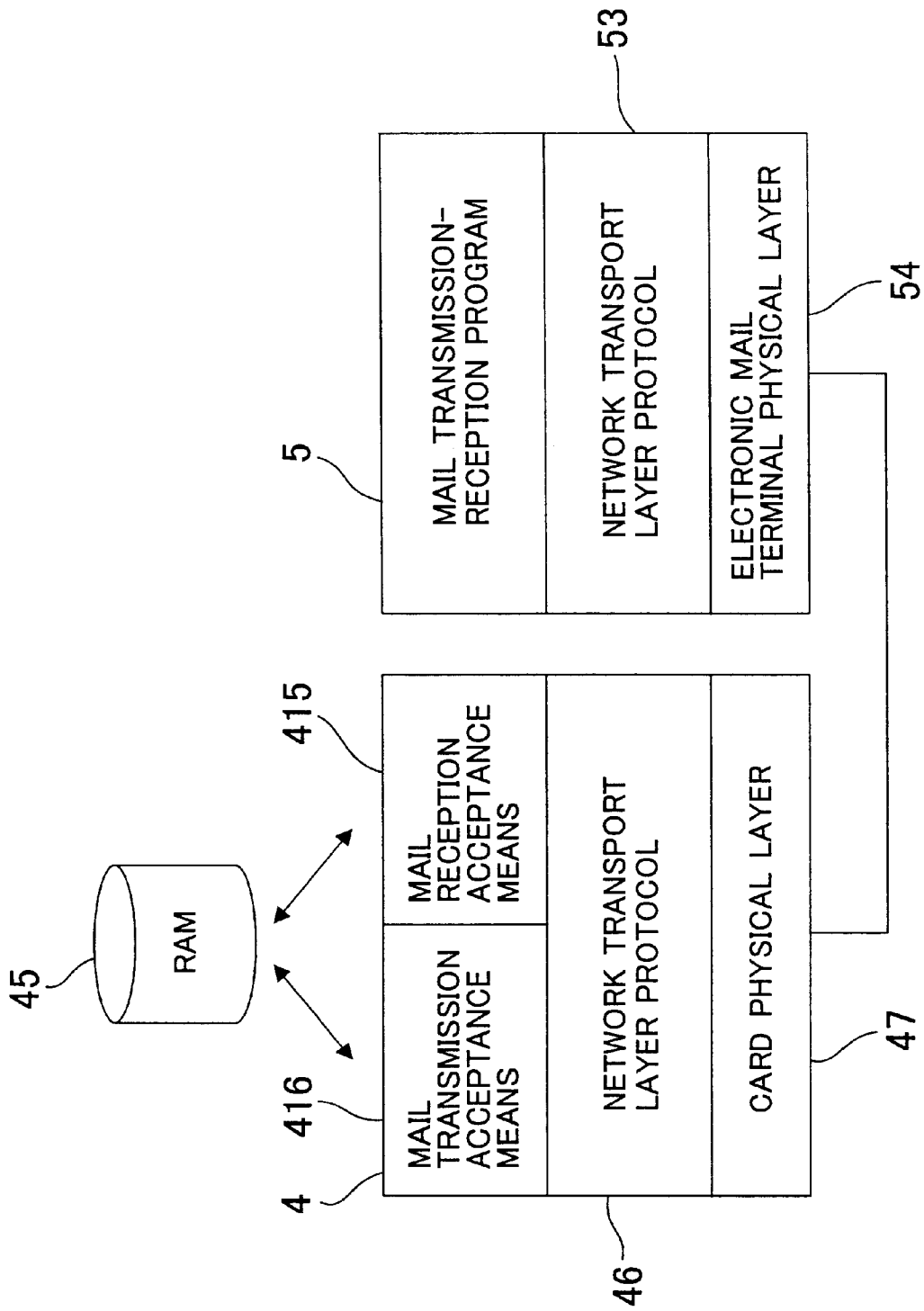
FIG. 5 is a diagrammatic view illustrating a protocol hierarchy between the card and an electronic mail terminal in the data transmission-reception system of FIG. 1.

FIG. 5 illustrates a protocol hierarchy between the card 4 and the electronic mail terminal 5 in the data transmission-reception system of FIG. 1, that is, a protocol hierarchy when the card 4 is connected to the electronic mail terminal 5.

The network transport layer protocol 46 of the card 4 side and a network transport layer protocol 53 of the electronic mail terminal 5 side are such as, for example, the TCP/IP. The card physical layer 47 and a electronic mail terminal physical layer 54 are such as, for example, the RS232C. In this instance, the card 4 operates as a representative of a main server, and the mail reception acceptance means 415 and the mail transmission acceptance means 416 operate while the mail reception means 411 and the mail transmission means 412 do not operate.

More specifically, the mail reception acceptance means 415 operates based on various setting information stored in the RAM 45. If an electronic mail acquisition request to a mail server is received from the electronic mail terminal 5, then the mail reception acceptance means 415 transmits electronic mails stored in the RAM 45 to the electronic mail terminal 5 through the interface 43 in accordance with the same method as that used to send by a mail server. Also the mail transmission acceptance means 416 operates based on the setting information stored in the RAM 45 similarly, and when an electronic mail transmission request to a mail server is received from the electronic mail terminal 5, the mail transmission acceptance means 416 receives the electronic mail and stores it as a main to be transmitted into the RAM 45.

Figure 6:
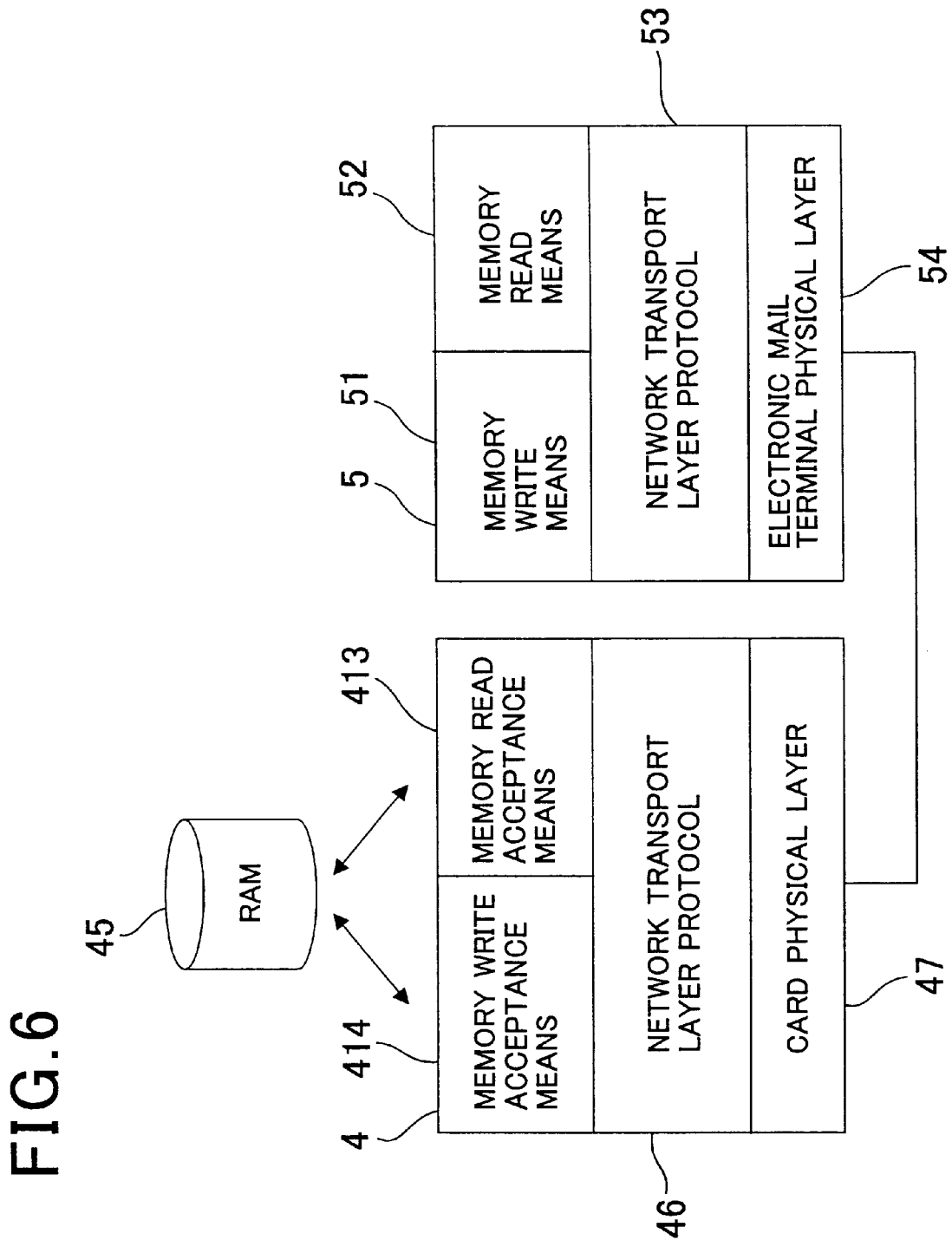
FIG. 6 is a diagrammatic view illustrating a protocol hierarchy in the data transmission-reception system of FIG. 1 when the electronic mail terminal accesses a RAM in the card.

FIG. 6 illustrates a protocol hierarchy when the RAM 45 in the card 4 is accessed in the data transmission-reception system of FIG. 1, that is, a protocol hierarchy when stored contents in the RAM 45 in the card 4 are to be accessed for reading or writing from the electronic mail terminal 5. Preferably, for memory write means 51 and memory read means 52 shown in FIG. 6, those incorporated as standards in the electronic mail terminal 5 can be used. When stored contents of the RAM 45 are to be referred to by the electronic mail terminal 5, the memory read means 52 sends a memory read request and a designated object address for reading to the memory read acceptance means 413. Consequently, the memory read acceptance means 413 reads in stored contents from the designated address of the RAM 45 and sends the read contents to the memory read means 52 through the interface 43.

When writing from the electronic mail terminal 5 into the RAM 45 is to be performed, the memory write means 51 sends contents to be written and an object address for writing to the mail write acceptance means 414. The mail write acceptance means 414 thus writes the contents sent thereto into the designated address of the RAM 45. The reading and writing means described above can be used to read out various setting information stored in the RAM 45 from the electronic mail terminal 5 and write such information into the RAM 45 from the electronic mail terminal 5. Also it is possible to write a substitute program for the program stored in the ROM into the RAM 45.

In the data transmission-reception system having the construction described above, even if the electronic mail terminal 6 and the portable telephone terminal 3 are not connected to each other by a cable or the like, transmission-reception of an electronic is allowed only by changing over the destination of loading of the card 4 between the portable telephone terminal 3 and the electronic mail terminal 5. Besides, even if the user does not take notice of the radio wave condition, transmission-reception can be performed automatically and independently of the memory capacity of the portable telephone terminal 3 when the radio wave condition becomes good.

Figure 7:
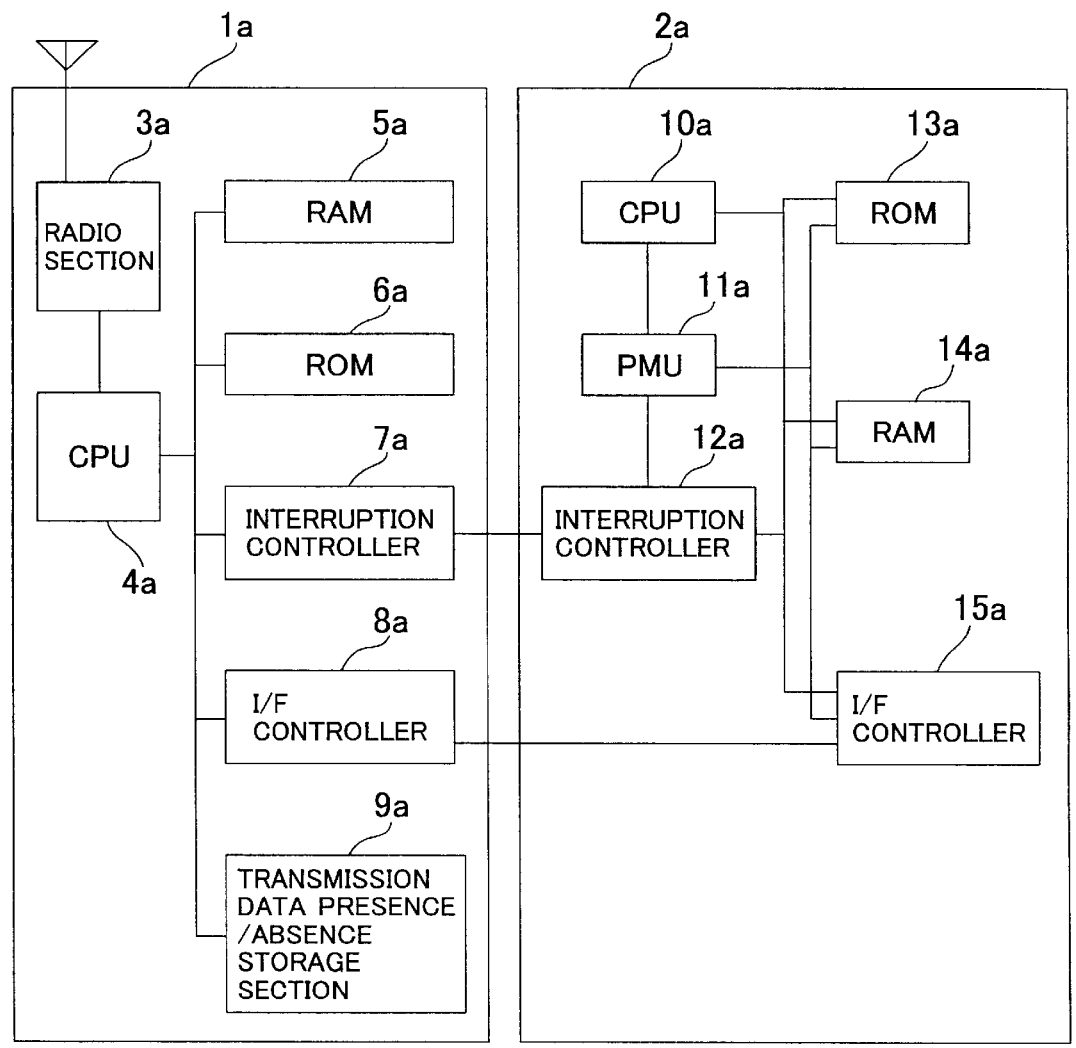
FIG. 7 is a block diagram showing a system construction of another data transmission-reception system to which the present invention is applied.

FIG. 7 shows another data transmission-reception system to which the present invention is applied. Referring to FIG. 7, the system shown includes a portable radio terminal la and a fixed information terminal 2a. The portable radio terminal la is a portable terminal of a small size and a light weight having a built-in radio unit. The fixed information terminal 2a is a terminal which is inferior in portability such as a personal computer of the desk top type, the notebook type or the like but includes a large capacity memory and a high speed CPU. The portable radio terminal 1a includes a radio section 3a for communicating data by radio, a CPU 4a for processing data, a RAM 5a. which is a memory for storing data, a ROM 6a which is a memory in which data and a program are stored in advance, an interruption controller 7a for generating an interruption to the fixed information terminal 2a in accordance with various conditions, an I/F controller 8a for transmitting and receiving data to and from the fixed information terminal 2a, and a transmission data presence/absence storage section 9a for storing whether or not the fixed information terminal 2a has transmission data and a capacity of the transmission data.

The fixed information terminal 2a includes a CPU 10a for processing data, a power management unit (PMU) 11a for performing power management of the entire fixed information terminal 2a, an interruption controller 12a for controlling an interruption from the portable radio terminal 1a, a ROM 13a in which data and a program are stored in advance, a RAM 14a for storing data, and an I/F controller 15a for transmitting and receiving data to and from the portable radio terminal 1a.

Usually, the portable radio terminal 1a is carried while the fixed information terminal 2a remains installed in a house, an office or the like. When transmission-reception of data is required, the portable radio terminal 1a and the fixed information terminal 2a are connected to each other to perform transmission-reception of data. When transmission-reception of data is performed, power is supplied normally to the portable radio terminal 1a so that the portable radio terminal 1a may remain in an enabled state. When the fixed information terminal 2a is not used, the fixed information terminal 2a can be placed into a suspended state, and consequently, power consumption can be reduced.

Figure 8:
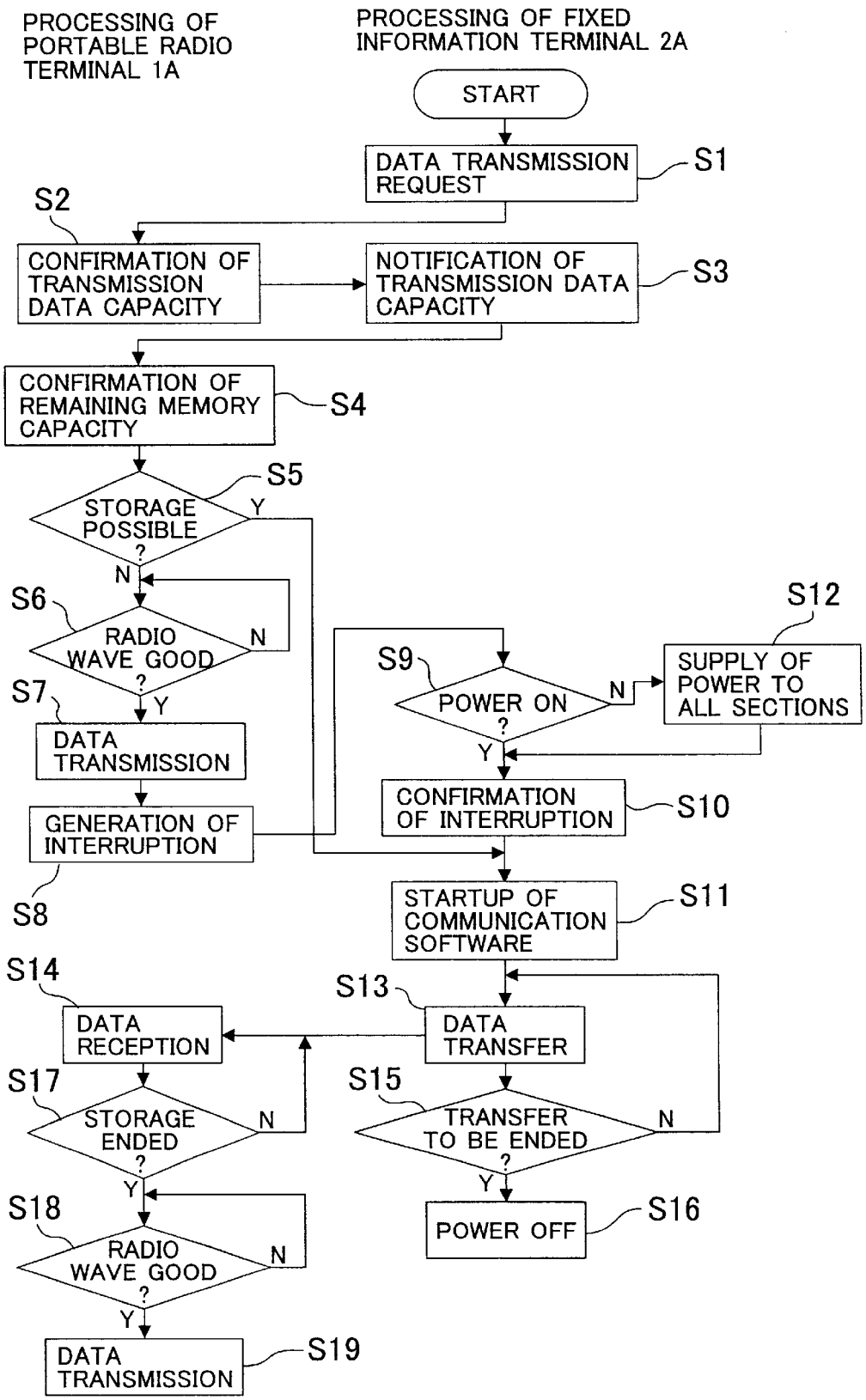
FIG. 8 is a flow chart illustrating a data transmission process of the system of FIG. 7.

FIG. 8 illustrates processing when the fixed information terminal 2a shown in FIG. 7 issues a data transmission request. Now, transmission processing of the system of FIG. 7 is described with reference to the flow chart of FIG. 8.

If the fixed information terminal 2a issues a data transmission request to the portable radio terminal 1a (step S1), then the portable radio terminal 1a confirms the capacity of transmission data (step S2). The portable radio terminal 1a notifies the confirmed capacity of the transmission data to the fixed information terminal 2a (step S3). Then, the portable radio terminal 1a confirms the remaining memory amount of the internal RAM 5a (step S4) and discriminates whether or not the requested transmission data can be stored into the RAM 5a (step S5).

If the free capacity of the RAM 5a is smaller than the transmission request data amount (N (No) in step S5), then the CPU 4a of the portable radio terminal 1a supervises the radio section 3a to discriminate whether or not the radio wave condition is good and waits until the radio wave condition becomes good (step S6). In this instance, the portable radio terminal 1a stores presence or absence of transmission data into the transmission data presence/absence storage section 9a in order to store the fact that a transmission request has been received from the fixed information terminal 2a. Further, when the fixed information terminal 2a is not used thereafter, power to the fixed information terminal 2a is disconnected. Then, after the radio wave condition becomes good (Y (Yes) in step S6), the portable radio terminal 1a transmits the data stored in the RAM 5a formerly to a server (not shown in FIG. 7, refer to FIG. 1) (step S7). Further, when the CPU 4a of the portable radio terminal 1a confirms that the radio wave condition is good, it controls the interruption controller 7a to generate an interruption to the fixed information terminal 2a (step S8).

At this time, the fixed information terminal 2a may be in a power-on state or in a suspended state. Therefore, the fixed information terminal 2a discriminates in which one of the states it is (step S9). If power is on (Y in step S9), then since the fixed information terminal 2a can operate immediately, it confirms the interruption factor (step S10) and performs startup processing of communication software for performing transmission-reception of data to and from the portable radio terminal 1a (step S11).

On the other hand, if the fixed information terminal 2a is in a suspended state in step S9 (N in step S9), then the PMU 11a starts supply of power to the CPU 10a, ROM 13a, RAM 14a and I/F controller 15a (step S12). If the fixed information terminal 2a is placed into an enabled state as a result of the supply of power, then it confirms the interruption factor similarly as in the case wherein power is on (step S10) and then performs startup processing of the communication software for performing transmission-reception of data to and from the portable radio terminal 1a (step S11). It is to be noted that, since the interruption controller 12a must normally be able to recognize an interruption, power is normally supplied to the interruption controller 12a.

If the fixed information terminal 2a confirms that contents of the interruption are a transmission data transfer request from the portable radio terminal 1a, then it reads in the communication software from the interruption controller 12a and starts up it (step S11). After the communication software is started up, the fixed information terminal 2a transfers the transmission data to the portable radio terminal 1a (step S13). Consequently, the portable radio terminal 1a receives the transmission data (step S14) and stores the received transmission data into the RAM 5a.

On the other hand, if it is discriminated in step S5 that the transmission data can be stored into the RAM 5a (Y in step S5), then the communication software is started up in step S11 as described above. Consequently, such data transfer as described above is performed in next step S13.

After such data transfer is performed, the fixed information terminal 2a discriminates whether or not the transmission processing should be ended, that is, whether or not all of the transmission data have been transferred (step S15). If the transmission processing should not be ended, then the processing returns to step S11, in which the fixed information terminal 2a repeats the transmission processing. However, if the transmission processing should be ended (Y in step S15), then the fixed information terminal 2a performs processing for restoring the original state. In particular, if the state before the communication is performed is a power-on state, then the fixed information terminal 2a ends the execution of the communication software and thereby ends its processing. On the other hand, if the state before the communication is performed is a suspended state, then the fixed information terminal 2a ends the execution of the communication software, and thereafter, the PMU 11a stops supply of power to the above-specified sections of the fixed information terminal 2a (step S16), thereby placing the fixed information terminal 2a into a suspended state.

On the other hand, the portable radio terminal 1a discriminates whether or not the storage processing of transmission data into the I/F controller 15a should be ended (step S17). If the storage processing should be ended (Y in step S17), then the portable radio terminal 1a confirms again whether or not the radio wave condition is good (step S18) and waits that the radio wave condition becomes good. Then, when the radio wave condition becomes good (Y in step S18), the portable radio terminal 1a performs transmission processing of the transmission data stored in the RAM 5a (step S19).

In this instance, if the communication rate of radio data is higher than the data transfer rate between the portable radio terminal 1a and the fixed information terminal 2a, the transmission processing of data stored already in the CPU 4a may possibly come to an end formerly, and in this instance, transmission of data being stored at present is suitably performed continuously. Since transfer of data from the fixed information terminal 2a to the portable radio terminal 1a is performed not after transmission processing for data stored already in the RAM 5a is completed in this manner, efficient data transfer can be performed.

Now, orderly description of operation of the data transmission-reception system having the system construction of FIG. 7 is given below.

If the portable radio terminal 1a receives a data transmission request from the fixed information terminal 2a, then it notifies the CPU 4a of the portable radio terminal 1a of the data transmission request. In response to the transmission request, the CPU 4a confirms the capacity of data to be transmitted from the fixed information terminal 2a. The CPU 4a confirms the remaining capacity of the RAM 5a and confirms whether or not the requested capacity from the fixed information terminal 2a is free. If the remaining capacity of the RAM 5a is insufficient, then the CPU 4a stores presence of transmission data into the transmission data presence/absence storage section 9a. Then, if the radio wave condition at the portable radio terminal 1a becomes good, then the CPU 4a confirms whether or not presence of transmission data is stored in the transmission data presence/absence storage section 9a. If presence of transmission data is confirmed, then the interruption controller 7a generates an interruption to the fixed information terminal 2a. Further, the CPU 4a transmits the data stored already in the RAM 5a to the server from the radio section 3a. When the interruption controller 12a of the fixed information terminal 2a recognizes the interruption, it notifies the CPU 10a of the interruption.

In this instance, if the fixed information terminal 2a is in a suspended state (that is, in a state wherein, although power is not supplied to the various sections of the fixed information terminal 2a, the fixed information terminal 2a can start up itself automatically in response to an external factor such as an interruption), the PMU 11a recognizes the interruption and starts supply of power to the CPU 10a, ROM 13a, RAM 14a and I/F controller 15a to place the fixed information terminal 2a into an enabled state. When the CPU 10a recognizes the interruption, it accesses the portable radio terminal 1a through the I/F controller 15a and stores the transmission data at a suitable timing into the RAM 5a of the portable radio terminal 1a. While the data transmission is performed, next data are stored into the RAM 5a, and consequently, efficient data transfer can be performed. After the transmission data are stored into the RAM 5a, the CPU 4a notifies the radio section 3a of completion of preparation for data transmission and starts transmission of the next data through the radio section 3a. At this time, if the radio wave condition is bad, transmission is performed after it is waited that the radio wave condition becomes good.

Figure 9:
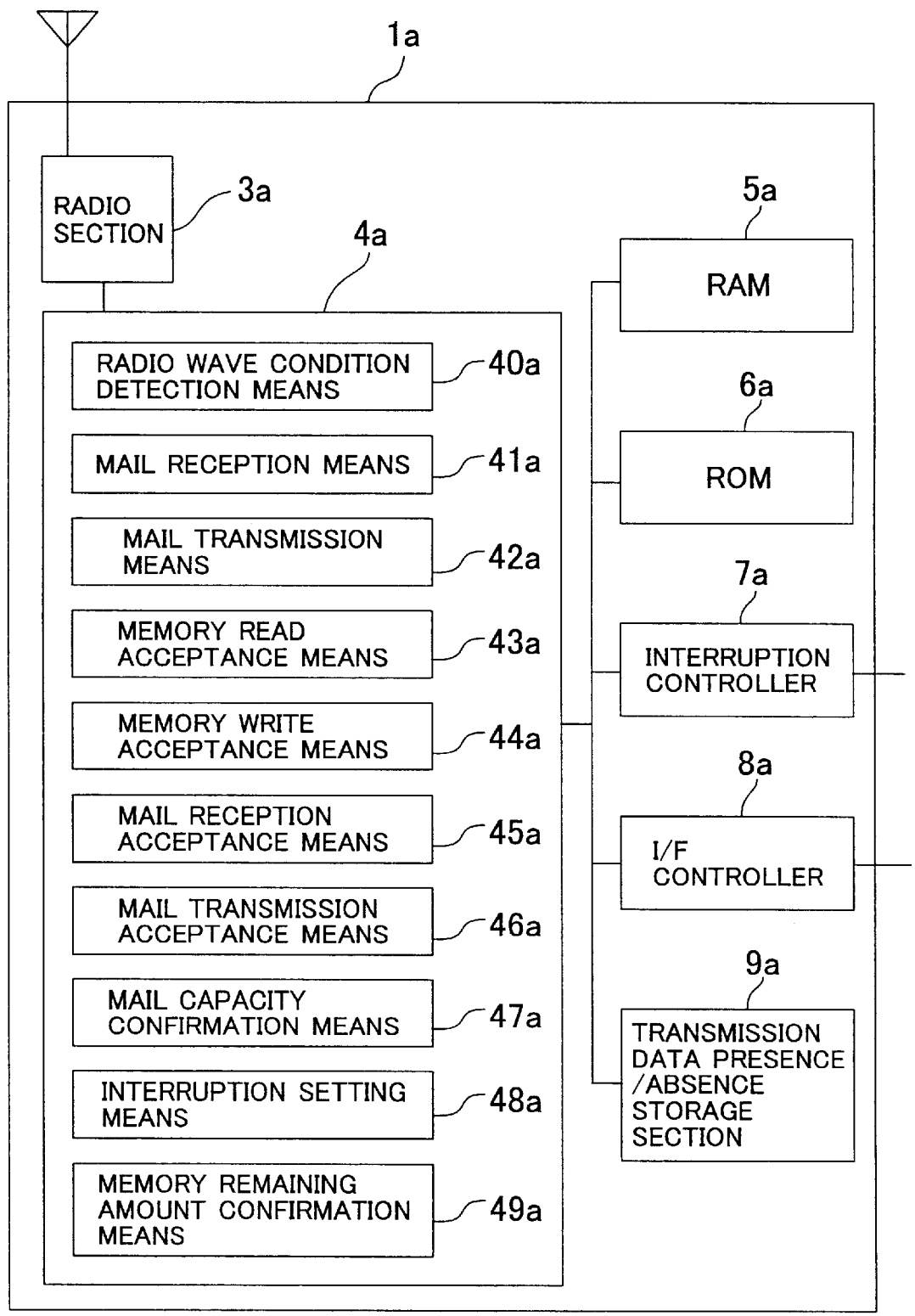
FIG. 9 is a block diagram showing an internal construction of a portable radio terminal of the system of FIG. 7 when an electronic mail terminal is used as an information terminal.

Now, a modification to the data transmission-reception system described hereinabove with reference to FIG. 7 is described. The modified data transmission-reception system uses an electronic mail terminal in place of a fixed information terminal as an information terminal, and FIG. 9 shows a construction of the portable radio terminal 1a of the modified data transmission-reception system where an electronic mail terminal is used as an information terminal. The portable radio terminal 1a of FIG. 9 is a modification to but different from the portable radio terminal shown in FIG. 7 only in functions of the CPU 4a thereof. Thus, in order to illustrate details of the operation of the portable radio terminal 1a, only the functions of the CPU 4a of the portable radio terminal 1a are illustrated particularly in FIG. 9.

Referring to FIG. 9, the CPU 4a shown in FIG. 9 has functions as radio wave condition detection means 40a, mail reception means 41a, mail transmission means 42a, memory read acceptance means 43a, memory write acceptance means 44a, mail reception acceptance means 45a, mail transmission acceptance means 46a, mail capacity confirmation means 47a, interruption setting means 48a and memory remaining amount confirmation means 49a. The CPU 4a performs processing operation similar to that described hereinabove with reference to FIG. 8. Therefore, the modified data transmission-reception system is described with reference to FIGS. 7, 8 and 9.

The portable radio terminal 1a can operate as a representative of the electronic mail terminal 2a to connect itself to the mail server selectively when the radio wave condition is good and fetch electronic mails accumulated in the server and destined for the user of the portable radio terminal 1a through the dialup server and the radio section 3a. Further, the portable radio terminal 1a can similarly transmit electronic mails accumulated therein. On the other hand, when the portable radio terminal 1a is loaded in the electronic mail terminal 2a, it functions as if it were a mail server. Accordingly, the electronic mail terminal 2a can transmit and receive a mail in accordance with the same method as that where it is connected directly to a mail server. Thus, the user can use the electronic mail terminal to transmit and receive electronic mails without taking notice of the radio wave condition.

FIG. 8 illustrates processing when the electronic mail terminal 2a issues a main transmission request to the portable radio terminal 1a. Accordingly, in the modified data transmission-reception system, since the electronic mail terminal 2a issues a data transmission request, reception and transmission in the flow chart of FIG. 8 should be reversed.

If the electronic mail terminal 2a issues a mail transmission request to the portable radio terminal 1a (step S1), then the portable radio terminal 1a confirms the capacity of the transmission mail (step S2). The electronic mail terminal 2a confirms the capacity of the transmission mail and notifies the portable radio terminal 1a of the confirmed capacity (step S3). The portable radio terminal 1a confirms the remaining capacity of the internal RAM 5a (step S4) and discriminates whether or not the requested transmission mail can be stored into the RAM 5a (step S5). If the transmission mail can be stored into the RAM 5a (Y in step S5), then the processing advances to step S11 so that storage processing is executed subsequently. Processing in step S11 et seq. is hereinafter described.

On the other hand, if it is discriminated in step S5 that the free capacity of the RAM 5a is smaller than the capacity of the transmission mail (N in step S5), then the portable radio terminal 1a waits that the radio wave condition becomes good (step S6). In this instance, in order to store the fact that a transmission request has been received, the portable radio terminal 1a stores presence or absence of a transmission mail into the transmission data presence/absence storage section 9a. Further, the electronic mail terminal 2a disconnects the power supply if it is not used thereafter. Then, if the radio wave condition becomes good (Y in step S6), then the portable radio terminal 1a transmits the mail stored in the RAM 5a formerly to the mail server (step S7). Further, when the CPU 4a confirms that the radio wave condition has become good, it controls the interruption controller 7a to generate an interruption to the electronic mail terminal 2a (step S8). At this time, since the electronic mail terminal 2a may be in a power-on state or in a suspended state, it discriminates in whichever one of the states it is (step S9).

If the power supply is on (Y in step S9), then since the electronic mail terminal 2a can execute its operation immediately, it confirms the interruption factor (step S10) and performs startup processing of the communication software for performing transmission-reception of a mail to and from the portable radio terminal 1a (step S11). On the other hand, if the electronic mail terminal 2a is in a suspended state in step S9 (N in step S9), then the PMU 11a starts supply of power to the CPU 10a, ROM 13a, RAM 14a and I/F controller 15a (step S12). Then, if the electronic mail terminal 2a is placed into an enabled state as a result of the supply of power, then it confirms the interruption factor similarly as in the case wherein power is on (step S10) and then performs startup processing of the communication software for performing transmission-reception of a mail to and from the portable radio terminal 1a (step S11). It is to be noted, however, that, since the interruption controller 12a must normally be able to recognize an interruption, power is normally supplied to the interruption controller 12a.

If the electronic mail terminal 2a confirms that contents of the interruption are a transmission mail transfer request from the portable radio terminal 1a, then it reads in the communication software for performing data communication with the portable radio terminal 1a from the interruption controller 12a and starts up it. After the communication software is started up, the electronic mail terminal 2a transfers the transmission mail to the portable radio terminal 1a (step S13). Consequently, the portable radio terminal 1a receives the transmission mail (step S14) and stores the received transmission mail into the RAM 5a.

After such transmission of a transmission mail is performed, the electronic mail terminal 2a discriminates whether or not the transmission processing should be ended (step S15). If the transmission processing should be ended (Y in step S15), then the electronic mail terminal 2a performs processing for restoring the original state. In particular, if the state before the communication is performed is a power-on state, then the electronic mail terminal 2a ends the execution of the communication software and thereby ends its processing. On the other hand, if the state before the communication is performed is a suspended state, then the electronic mail terminal 2a ends the execution of the communication software, and thereafter, the PMU 11a stops the supply of power to the above-specified sections of the electronic mail terminal 2a, thereby placing the electronic mail terminal 2a into a suspended state (step S16).

On the other hand, the portable radio terminal 1a discriminates whether or not the storage processing of a transmission mail into the I/F controller 15a should be ended (step S17). If the storage processing should be ended (Y in step S17), then the portable radio terminal 1a confirms the radio wave condition again (step S18) and waits that the radio wave condition becomes good. Then, when the radio wave condition becomes good (Y in step S18)., the portable radio terminal 1a performs transmission processing of the transmission mail stored in the RAM 5a (step S19). In this instance, if the communication rate of radio data is higher than the data transfer rate between the portable radio terminal 1a and the electronic mail terminal 2a, then the transmission processing of data stored already in the CPU 4a may possibly come to an end formerly, and in this instance, transmission of a mail being stored at present is suitably performed continuously. Since transfer of a mail from the electronic mail terminal 2a to the portable radio terminal 1a is performed not after transmission processing for mails stored already in the RAM 5a is completed in this manner, efficient data transfer can be performed.

Figure 10:
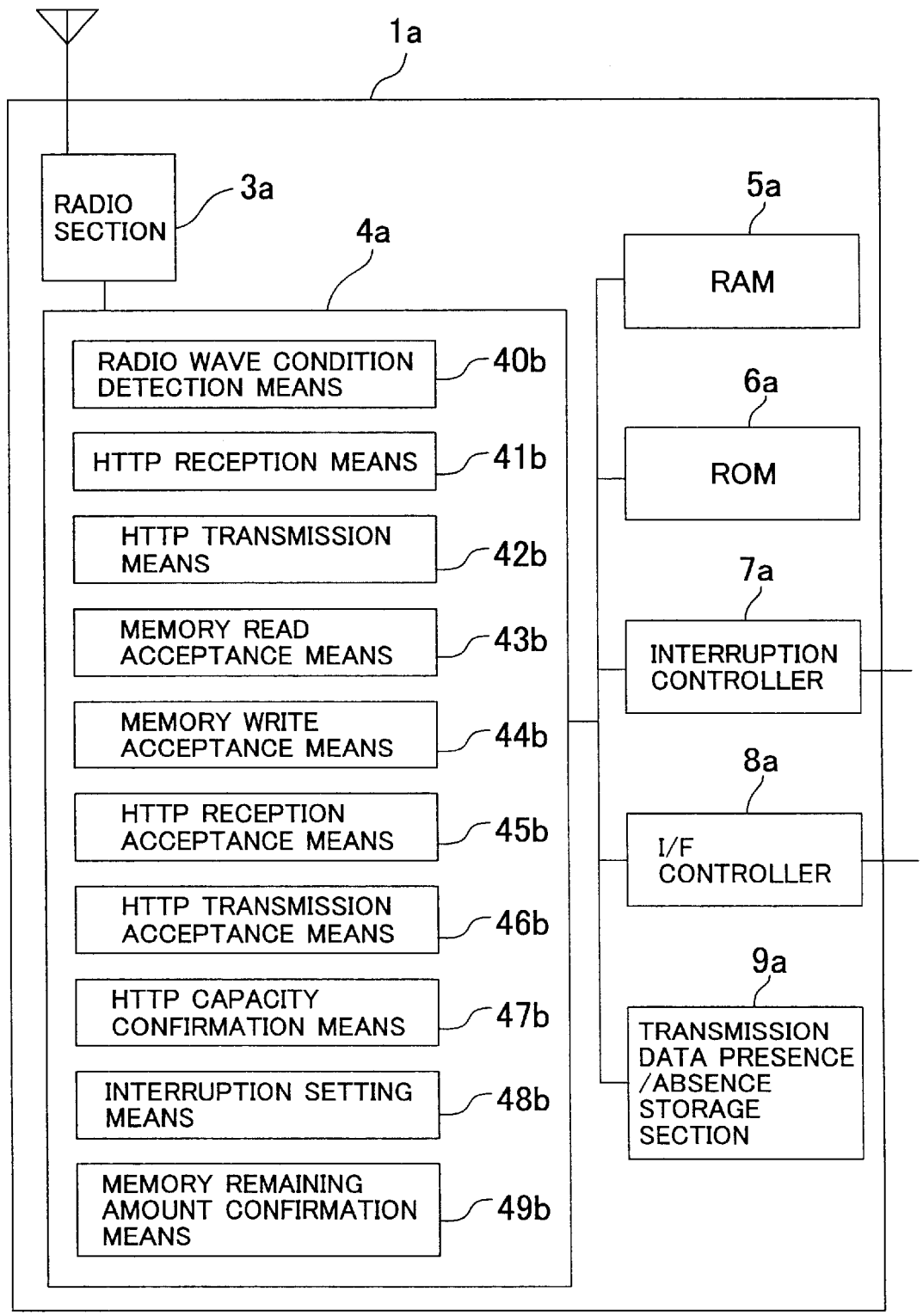
FIG. 10 is a block diagram showing an internal construction of the portable radio terminal of the system of FIG. 7 when a web browser terminal is used as an information terminal.

Now, another modification to the data transmission-reception system described hereinabove with reference to FIG. 7 is described. The present modified data transmission-reception system uses a web browser terminal as an information terminal, and FIG. 10 shows a construction of the portable radio terminal 1a of the modified data transmission-reception system where a web browser terminal is used as an information terminal. The portable radio terminal 1a of FIG. 10 is a modification to but different from the portable radio terminal shown in FIG. 7 only in functions of the CPU 4a thereof. Thus, in order to illustrate details of the operation of the portable radio terminal 1a, only the functions of the CPU 4a of the portable radio terminal 1a are illustrated particularly in FIG. 10.

Referring to FIG. 10, the CPU 4a shown has functions as radio wave condition detection means 40b, HTTP (Hyper Text Transfer Protocol) reception means 41b, HTTP transmission means 42b, memory read acceptance means 43b, memory write acceptance means 44b, HTTP reception acceptance means 45b, HTTP transmission acceptance means 46b, HTTP capacity confirmation means 47b, interruption setting means 48b and memory remaining amount confirmation means 49b. The CPU 4a performs processing operation similar to that described hereinabove with reference to FIG. 8. Therefore, the present modified data transmission-reception system is described with reference to FIGS. 7, 8 and 10.

The portable radio terminal 1a can operate as a representative of the web browser terminal 2a to connect itself to an HTTP server selectively when the radio wave condition is good and fetch a document of a URL (Uniform Resource Locator) set by the user of the portable radio terminal 1a through the dialup server and the radio section 3a. Further, the portable radio terminal 1a can similarly transmit HTTP documents accumulated therein.

On the other hand, when the portable radio terminal 1a is loaded in the web browser terminal 2a, it functions as if it were an HTTP server. Accordingly, the web browser terminal 2a can transmit and receive a document in accordance with the same method as that where it is connected directly to an HTTP server. Thus, the user can use the web browser terminal 2a to transmit and receive a document without taking notice of the radio wave condition.

FIG. 8 illustrates processing when a document request is issued to the HTTP server. Thus, operation when the web browser terminal 2a issues an acquisition request of a document of a URL set by the user to the HTTP server is described with reference to FIG. 8. It is to be noted that processing in the steps which is apparent from the foregoing description of the flow of operations of FIG. 8 is omitted herein to avoid redundancy.

First, the web browser terminal 2a confirms the capacity of transmission data (hereinafter referred to as URL data)

and notifies the portable radio terminal 1a of the confirmed capacity (step S3). Consequently, the portable radio terminal 1a confirms the remaining capacity of the internal RAM 5a (step S4) and discriminates whether or not the requested transmission data can be stored into the RAM 5a (step S5). If the transmission data can be stored into the RAM 5a, then the processing immediately executes storage processing immediately. On the other hand, if the free capacity of the RAM 5a is smaller than the capacity of the transmission data, then the portable radio terminal 1a waits that the radio wave condition becomes good (step S6). In this instance, in order to store the fact that a transmission request has been received, the portable radio terminal 1a stores presence or absence of transmission data (URL data) into the transmission data presence/absence storage section 9a. Further, the web browser terminal 2a disconnects the power supply if it is not used thereafter.

Then, if the radio wave condition becomes good, then the portable radio terminal 1a transmits the URL data stored in the RAM 5a formerly to the HTTP server (step S7). Further, when the CPU 4a confirms that the radio wave condition has become good, it controls the interruption controller 7a to generate an interruption to the web browser terminal 2a (step S8).

At this time, since the web browser terminal 2a may be in a power-on state or in a suspended state, it discriminates in whichever one of the states it is (step S9). If the power supply is on, then since the web browser terminal 2a can execute its operation immediately, it confirms the interruption factor (step S10) and performs startup processing of the communication software for performing transmission-reception of data to and from the portable radio terminal 1a (step S11). On the other hand, if the web browser terminal 2a is in a suspended state in step S9 (N in step S9), then the PMU 11a starts supply of power to the CPU 10a, ROM 13a, RAM 14a and I/F controller 15a (step S12).

Then, if the web browser terminal 2a is placed into an enabled state as a result of the supply of power, then it confirms the interruption factor similarly as in the case wherein power is on (step S10) and then performs startup processing of the communication software for performing transmission and reception of data to and from the portable radio terminal 1a (step S11). It is to be noted, however, that, since the interruption controller 12a must normally be able to recognize an interruption, power is normally supplied to the interruption controller 12a. If the web browser terminal 2a confirms that contents of the interruption are a transfer request of transmission data from the portable radio terminal 1a, then it reads in the communication software for performing data communication with the portable radio terminal 1a from the interruption controller 12a and starts up it. After the communication software is started up (step S11), the web browser terminal 2a transmits the transmission data to the portable radio terminal 1a (step S13). Then, when all of the transmission data are sent to the portable radio terminal 1a and stored into the RAM 5a and the transmission procession is ended thereby (step S15), the web browser terminal 2a performs processing for restoring the original state. In particular, if the state before the communication is performed is a power-on state, then the web browser terminal 2a ends the execution of the communication software and thereby ends its processing. On the other hand, if the state before the communication is performed is a suspended state, then the web browser terminal 2a ends the execution of the communication software, and thereafter, the PMU 11a stops the supply of power to the above-specified sections of the web browser terminal 2a, thereby placing the web browser terminal 2a into a suspended state (step S16).

On the other hand, if the portable radio terminal 1a discriminates that the storage processing of transmission data into the I/F controller 15a should be ended (step S17), then the portable radio terminal 1a confirms the radio wave condition again (step S18). Then, when the radio wave condition becomes good, the portable radio terminal 1a performs transmission processing of the transmission data stored in the RAM 5a (step S19). In this instance, if the communication rate of radio data is higher than the data transfer rate between the portable radio terminal 1a and the web browser terminal 2a, then the transmission processing of data stored already in the CPU 4a may possibly come to an end formerly, and in this instance, transmission of URL data being stored at present is suitably performed continuously. Since transfer of URL data from the web browser terminal 2a to the portable radio terminal 1a is performed not after transmission processing for URL data stored already in the RAM 5a is completed in this manner, efficient data transfer can be performed.

Figure 11:
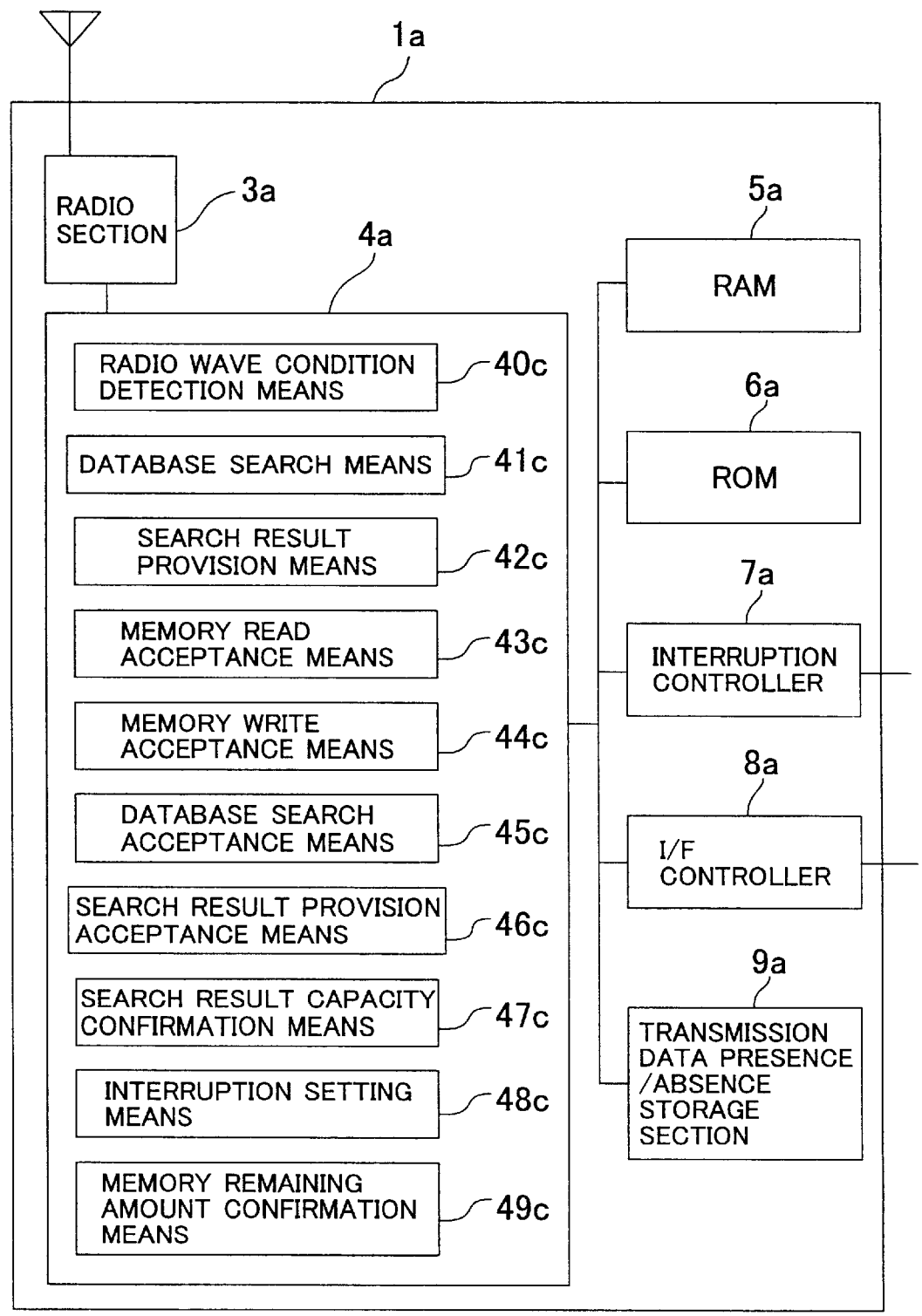
FIG. 11 is a block diagram showing an internal construction of the portable radio terminal of the system of FIG. 7 when a database search terminal is used as an information terminal.

Subsequently, a further modification to the data transmission-reception system described hereinabove with reference to FIG. 7 is described. The present modified data transmission-reception system uses a database search terminal as an information terminal, and FIG. 11 shows a construction of the portable radio terminal 1a of the modified data transmission-reception system where a database search terminal is used as an information terminal. The portable radio terminal 1a of FIG. 11 is a modification to but different from the portable radio terminal shown in FIG. 7 only in functions of the CPU 4a thereof. Thus, in order to illustrate details of the operation of the portable radio terminal 1a, only the functions of the CPU 4a of the portable radio terminal 1a are illustrated particularly in FIG. 11.

Referring to FIG. 11, the CPU 4a shown has functions as radio wave condition detection means 40c, database search means 41c, search result provision means 42c, memory read acceptance means 43c, memory write acceptance means 44c, database search acceptance means 45c, search result provision acceptance means 46c, search result capacity confirmation means 47c,interruption setting means 48c and memory remaining amount confirmation means 49c. The CPU 4a performs processing operation similar to that described hereinabove with reference to FIG. 8. Therefore, the data transmission-reception system of the present embodiment is described with reference to FIGS. 7, 8 and 11.

The portable radio terminal 1a can operate as a representative of the database search terminal 2a to connect itself to a database server selectively when the radio wave condition is good and fetch a result of a search through the dialup server and the radio section 3a. Further, the portable radio terminal 1a can similarly transmit search conditions accumulated therein. On the other hand, when the portable radio terminal 1a is loaded in the database search terminal 2a, it functions as if it were a database server. Accordingly, the database search terminal 2a can transmit and receive a result of a search and search conditions in accordance with the same method as that where it is connected directly to a database server. Thus, the user can use the database search terminal 2a to transmit and receive a document without taking notice of the radio wave condition.

FIG. 8 illustrates processing when a database search request is issued to the database server. Thus, processing when the database search terminal 2a issues a database search request to the database server is described with reference to FIG. 8. If the data base search terminal 2a confirms the capacity of transmission data (hereinafter referred to as all search conditions) and notifies the portable radio terminal 1a of the confirmed capacity (step S3), then the portable radio terminal 1a confirms the remaining capacity of the internal RAM 5a (step S4) and discriminates whether or not the requested transmission data can be stored into the RAM 5a (step S5). If the transmission data can be stored into the RAM 5a, then the processing immediately executes storage processing.

On the other hand, if the free capacity of the RAM 5a is smaller than the capacity of the transmission data, then the portable radio terminal 1a waits that the radio wave condition becomes good (step S6). In this instance, in order to store the fact that a transmission request has been received, the portable radio terminal 1a stores presence or absence of transmission data into the transmission data presence/absence storage section 9a. Further, the database search terminal 2a disconnects the power supply if it is not used thereafter. Then, if the radio wave condition becomes good, then the portable radio terminal 1a transmits data (all search conditions) stored in the RAM 5a formerly to the database server (step S7). Further, when the CPU 4a confirms that the radio wave condition has become good, it controls the interruption controller 7a to generate an interruption to the database search terminal 2a (step S8). At this time, since the database search terminal 2a may be in a power-on state or in a suspended state, it discriminates in whichever one of the states it is (step S9).

If the power supply is on, then since the database search terminal 2a can execute its operation immediately, it confirms the interruption factor (step S10) and performs startup processing of communication software for performing transmission-reception of data to and from the portable radio terminal 1a (step S11). On the other hand, if the database search terminal 2a is in a suspended state in step S9 (N in step S9), then the PMU 11a starts supply of power to the CPU 10a, ROM 13a, RAM 14a and I/F controller 15a (step S12). Then, if the database search terminal 2a is placed into an enabled state as a result of the supply of power, then it confirms the interruption factor similarly as in the case wherein power is on (step S10) and then performs startup processing of the communication software for performing transmission and reception of data to and from the portable radio terminal 1a (step S11). It is to be noted, however, that, since the interruption controller 12a must normally be able to recognize an interruption, power is normally supplied to the interruption controller 12a.

If the database search terminal 2a confirms that contents of the interruption are a transfer request of transmission data from the portable radio terminal 1a, then it reads in the communication software for performing data communication with the portable radio terminal 1a from the interruption controller 12a and starts up it. After the communication software is started up (step S11), the database search terminal 2a transmits the transmission data to the portable radio terminal 1a (step S13). Then, the portable radio terminal 1a receives the transmission data (step S14) and stores the transmission data into the RAM 5a.

After such transmission processing is completed, the database search terminal 2a performs processing for restoring the original state. In particular, if the state before the communication is performed is a power-on state, then the database search terminal 2a ends the execution of the communication software and thereby ends its processing. On the other hand, if the state before the communication is performed is a suspended state, then the database search terminal 2a ends the execution of the communication software, and thereafter, the PMU 11a stops supply of power to the above-specified sections of the database search terminal 2a, thereby placing the database search terminal 2a into a suspended state (step S16).

Then, if the storage processing of the transmission data into the I/F controller 15a is ended (step S17), then the portable radio terminal 1a confirms the radio wave condition again (step S18). Then, when the radio wave condition becomes good, the portable radio terminal 1a performs transmission processing of the transmission data stored in the RAM 5a (step S19). If the communication rate of radio data is higher than the data transfer rate between the portable radio terminal 1a and the database search terminal 2a, then the transmission processing of data stored already in the CPU 4a may possibly come to an end formerly, and in this instance, transmission of data being stored at present is suitably performed continuously. Since transfer of data from the database search terminal 2a to the portable radio terminal 1a is performed not after transmission processing for data stored already in the RAM 5a is completed in this manner, efficient data transfer can be performed.

Figure 12:
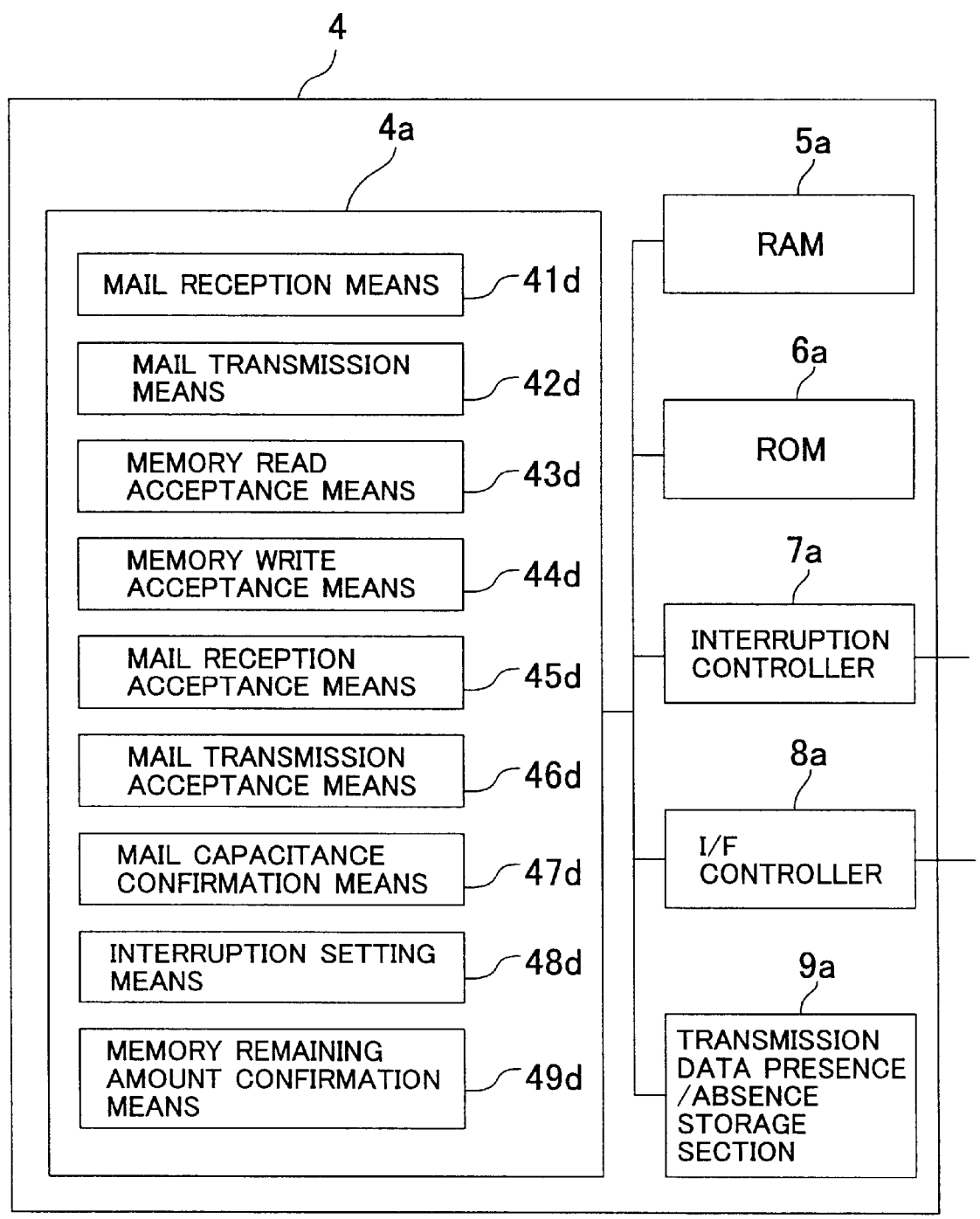
FIG. 12 is a block diagram showing another internal construction of the card shown in FIG. 1 when an electronic mail terminal is used as an information terminal.

Subsequently, a modification to the data transmission-reception system of the first embodiment wherein a portable telephone terminal, a card and an electronic mail terminal are used is described. FIG. 12 shows an internal construction of the card 4, and the modified data transmission-reception system is different from that of the first embodiment only in functions of the CPU 4a. Thus, in order to illustrate details of the operation of the CPU 4a, only the functions of the CPU 4a of the card 4 are illustrated particularly in FIG. 12.

Referring to FIG. 12, the CPU 4a shown has functions as mail reception means 41d, mail transmission means 42d, memory read acceptance means 43d, memory write acceptance means 44d, mail reception acceptance means 45d, mail transmission acceptance means 46d, mail capacitance confirmation means 47d, interruption setting means 48d and memory remaining amount confirmation means 49d. The CPU 4a performs processing operation similar to that described hereinabove with reference to FIG. 8. Therefore, operation of the modified data transmission-reception system is described with reference to FIGS. 1, 7, 8 and 12. It is to be noted that the flow chart of FIG. 8 illustrate processing when the electronic mail terminal 5 shown in FIG. 1 issues a mail transmission request. Therefore, description with reference to the flow chart of FIG. 8 is given using the reference characters of the system of FIG. 1.

If the electronic mail terminal 5 issues a mail transmission request (step S1), then the card 4 confirms the capacity of a transmission mail from the electronic mail terminal 5 (step S2). In this instance, the confirmation of the capacity of a transmission mail is set by the mail transmission acceptance means 46d of the CPU 4a and is conveyed to the electronic mail terminal 5 through the I/F controller 8a (step S3). Further, the memory remaining amount confirmation means 49a confirms the free capacity of the RAM 5a (step S4). Then, the CPU 4a discriminates whether or not the capacity of the transmission mail conveyed from the electronic mail terminal 5 can be stored into the RAM 5a. (step S5), and performs storage processing immediately if the transmission mail can be stored into the RAM 5a.

On the other hand, if the free capacity of the RAM 5a is smaller than the capacity of the transmission mail, then the card 4 connects itself to the portable telephone terminal 3 and waits that the radio wave condition becomes good (step S6). In this instance, in order to store the fact that a transmission request has been received, the card 4 stores presence or absence of transmission data into the transmission data presence/absence storage section 9a. Further, the electronic mail terminal 5 disconnects the power supply if it is not used thereafter.

Then, if the radio wave condition becomes good, then the card 4 transmits a transmission mail set by the mail transmission means 42d and stored in the RAM 6a formerly to the mail server 1 through the portable telephone terminal 3 (step S7). At this time, the user must remove the card 4 from the electronic mail terminal 5 and load it into the portable telephone terminal 3 or must connect the card 4 to the electronic mail terminal 5 while it is kept connected to the portable telephone terminal 3. Therefore, means for notifying the user such as flickering of a light emitting diode (LED) is required. However, in order to allow radio data communication with a higher efficiency, the card 4 must be connected to the electronic mail terminal 5 while it is kept connected to the portable telephone terminal 3. In this instance, the CPU 4a is set by the interruption setting means 48d and controls the interruption controller 7 to generate an interruption to the electronic mail terminal 5 (step S8). At this time, the user must connect the card 4 to the electronic mail terminal 5 while it is kept connected to the portable telephone terminal 3. Therefore, means for notifying the user such as flickering of an LED is required.

At this time, since the electronic mail terminal 5 may be in a power-on state or in a suspended state, it discriminates in whichever one of the states it is (step S9). If the power supply is on, then since the electronic mail terminal 5 can execute its operation immediately, it confirms the interruption factor (step S10) and performs startup processing of the communication software for performing transmission-reception of a mail to and from the card 4 (step S11). On the other hand, if the electronic mail terminal 5 is in a suspended state in step S9 (N in step S9), then the PMU 11a starts supply of power to the CPU 10a, ROM 13a, RAM 14a and I/F controller 15a (step S12).

Then, if the electronic mail terminal 5 is placed into an enabled state as a result of the supply of power, then it confirms the interruption factor similarly as in the case wherein power is on (step S10) and then performs startup processing of the communication software for performing transmission and reception of a mail to and from the card 4 (step S11). It is to be noted, however, that, since the interruption controller 12a must normally be able to recognize an interruption, power is normally supplied to the interruption controller 12a.

If the electronic mail terminal 5 confirms that contents of the interruption are a transfer request of a transmission mail from the card 4, then it reads in the communication software for performing data communication with the card 4 from the interruption controller 12a and starts up it. After the communication software is started up (step S11), the electronic mail terminal 5 transmits the transmission mail to the card 4 (step S13). Then, the card 4 receives the transmission mail (step S14) and the memory write acceptance means 44d sets and stores the transmission main into the RAM 5a (step S17). After such transmission processing is completed, the electronic mail terminal 5 performs processing for restoring the original state. In particular, if the state before the communication is performed is a power-on state, then the electronic mail terminal 5 ends the execution of the communication software and thereby ends its processing. On the other hand, if the state before the communication is performed is a suspended state, then the electronic mail terminal 5 ends the execution of the communication software, and thereafter, the PMU 11a stops supply of power to the above-specified sections of the electronic mail terminal 5, thereby placing the electronic mail terminal 5 into a suspended state (step S16).

Then, if the storage processing of the transmission mail into the RAM 5a is ended (step S17), then the card 4 confirms the radio wave condition again (step S18). Then, when the radio wave condition becomes good, the card 4 performs transmission processing of the transmission data (search conditions) stored in the RAM 6a (step S19). At this time, it is necessary to load the card 4 into the portable telephone terminal 3 in place of the electronic mail terminal 5 or connect the card 4 to the portable telephone terminal 3 while the card 4 is kept connected to the electronic mail terminal 5. Therefore, means for notifying the user such as flickering of an LED is required. Further, if the communication rate of radio data is higher than the data transfer rate between the portable telephone terminal 3 and the electronic mail terminal 5, then the transmission processing of a mail stored already in the CPU 4a may possibly come to an end formerly, and in this instance, transmission of a mail being stored at present is suitably performed continuously. Since transfer of a mail to the portable telephone terminal 3 is performed not after transmission processing for data stored already in the RAM 5a is completed in this manner, efficient data transfer can be performed.

On the other hand, where a card similar to the card 4 shown in FIG. 12 is used and a web browser terminal is used in place of the electronic mail terminal 5, the construction of the card 4 shown in FIG. 12 is replaced by the portable radio terminal 1a shown in FIG. 10 such that the mail reception means 41d is replaced by the HTTP reception means 41b, the mail transmission means 42d by the HTTP transmission means 42b, the mail reception acceptance means 45d by the HTTP reception acceptance means 45b, the mail transmission acceptance means 46d by the HTTP transmission acceptance means 46b, and the mail capacitance confirmation means 47d by the HTTP capacity confirmation means 47b. It is to be noted that processing operation in this instance is similar to that described hereinabove with reference to FIG. 8, and accordingly, overlapping description thereof is omitted herein to avoid redundancy.

Further, where a card similar to the card 4 of FIG. 12 is used and a database search terminal is used in place of the electronic mail terminal 5, the construction of the card 4 shown in FIG. 12 is replaced by the portable radio terminal 1a shown in FIG. 11 such that the mail reception means 41d is replaced by the database search means 41c, the mail transmission means 42d by the search result provision means 42c, the mail reception acceptance means 45d by the database search acceptance means 45c, the mail transmission acceptance means 46d by the search result provision acceptance means 46c, and the mail capacitance confirmation means 47d. by the search result capacity confirmation means 47c. It is to be noted that processing operation in this instance is similar to that described hereinabove with reference to FIG. 8, and accordingly, overlapping description thereof is omitted herein to avoid redundancy.

While the foregoing description of operation of the data transmission-reception systems of the embodiments and the modifications described hereinabove relates only to a case wherein the client side accesses the server side, they may operate as push type systems (that is, data is transmitted from a server to a client). Also in such alternative systems, processing operation is similar to that described hereinabove with reference to the flow chart of FIG. 8 except that it is different only in an access starting method wherein a data transmission request is issued from the server.

While preferred embodiments of the present invention have been described using specific terms, such description is for illustrative purpose only, and it is to be understood that changes and variations may be made without departing from the spirit or scope of the following claims.

What is claimed is:

1. A data transmission-reception system, comprising:

a server;

an information terminal serving as a client; and a portable radio terminal capable of transmitting and receiving data to and from said server over a radio circuit for allowing communication of data between said information terminal and said server;

said portable radio terminal including storage means for temporarily storing data, radio wave condition detection means for detecting whether or not a radio wave condition is good, and control means for controlling said portable radio terminal such that, upon reception of data from said server, when the radio wave condition is good, data received from said server is transferred immediately to said information terminal without being stored into said storage means, and upon transmission of data to said server, when the radio wave condition is good, data transferred from said information terminal is transmitted to said server.

2. A data transmission-reception system as claimed in claim 1, further comprising a data transfer medium capable of being selectively connected to said portable radio terminal and said information terminal, said data transfer medium having a memory function and a data transfer function, said data transfer medium when connected to said portable radio terminal being operable to store reception data received by said portable radio terminal and transfer stored data to be transmitted to said portable radio terminal, said data transfer medium when connected to said information terminal being operable to transfer stored reception data to said information terminal and store data to be transmitted from said information terminal.

3. A data transmission-reception system as claimed in claim 2, wherein said data transfer medium is a card in which a memory is built.

4. A data transmission-reception system according to claim 1, wherein said portable radio terminal stores data to be transmitted transferred from said information terminal and transmits the data to said server when the radio wave condition is good.

5. A data transmission-reception system according to claim 1, wherein said portable radio terminal further includes interruption generation means for generating an interruption signal to said information terminal when the radio wave condition becomes good, and when said information terminal receives the interruption signal, said information terminal transfers data to be transmitted to said portable radio terminal.

6. A data transmission-reception system according to claim 1, wherein said portable radio terminal further includes interruption generation means for generating an interruption signal to said information terminal when the radio wave condition becomes good, and when said information terminal receives the interruption signal, said information terminal starts up communication software thereof.

7. A data transmission-reception system according to claim 6, wherein, when said information terminal receives the interruption signal from said portable radio terminal, said information terminal confirms whether or not said information terminal is in a suspended state, and when said information terminal is in a suspended state, said information terminal first makes supply of power to components thereof available and then starts up the communication software.

8. A data transmission-reception system according to claim 7, wherein, after said information terminal starts up the communication software, said information terminal transfers data to be transmitted to said portable radio terminal and then stops the supply of power to the components thereof to restore its suspended state.

9. A data transmission-reception system according to claim 1, wherein said portable radio terminal further includes memory capacity confirmation means for receiving a transmission data capacity notification from said information terminal and confirming whether or not the transmission data to be received from said information terminal can be stored into said storage means, and when a result of the confirmation by said memory capacity confirmation means indicates that the transmission data can be stored into said storage means, said information terminal transfers the data to be transmitted to said portable radio terminal.

10. A data transmission-reception system as claimed in claim 9, wherein said portable radio terminal includes transmission data presence/absence storage means for storing that a data transmission request has been received from said information terminal when the result of the confirmation by said memory capacity confirmation means indicates that the transmission data cannot be stored into said storage means.

11. A data transmission-reception system as claimed in claim 1, wherein said server is a mail server, and said information terminal is an electronic mail terminal.

12. A data transmission-reception system as claimed in claim 1, wherein said server is a hyper text transfer protocol server, and said information terminal is a web browser terminal.

13. A data transmission-reception system as claimed in claim 1, wherein said server is a database server, and said information terminal is a database search terminal.

14. A data transmission-reception system as claimed in claim 1, wherein said portable radio terminal is a portable telephone terminal.

* * * * *